(12) United States Patent  
Esaki et al.

(10) Patent No.: US 9,204,511 B2  
(45) Date of Patent: Dec. 1, 2015

(54) LIGHTING APPARATUS AND LIGHTING FIXTURE USING SAME

(71) Applicant: Panasonic Intellectual Property Management Co., Ltd., Osaka (JP)

(72) Inventors: Sana Esaki, Osaka (JP); Masahiro Naruo, Osaka (JP); Kenichi Fukuda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/433,785

(22) PCT Filed: Oct. 10, 2013

(86) PCT No.: PCT/JP2013/006036  
§ 371 (c)(1),  
(2) Date: Apr. 6, 2015

(87) PCT Pub. No.: WO2014/057677  
PCT Pub. Date: Apr. 17, 2014

(65) Prior Publication Data  
US 2015/0250034 A1    Sep. 3, 2015

(30) Foreign Application Priority Data

Oct. 10, 2012 (JP) ................................ 2012-225409  
Apr. 12, 2013 (JP) ................................ 2013-083588  
Oct. 2, 2013 (JP) ................................ 2013-207504

(51) Int. Cl.  
    *H05B 37/02*      (2006.01)  
    *H05B 33/08*      (2006.01)  
    *H02M 3/156*     (2006.01)

(52) U.S. Cl.  
CPC ........... *H05B 33/0845* (2013.01); *H02M 3/156* (2013.01); *H05B 33/0815* (2013.01); *H05B 33/0821* (2013.01); *H05B 33/0857* (2013.01); *H05B 33/0818* (2013.01)

(58) Field of Classification Search  
USPC ................... 315/185 R, 209 R, 291, 307, 308  
See application file for complete search history.

(56) References Cited

U.S. PATENT DOCUMENTS 7,495,425 B2 *   2/2009   Friedrich .............. H02M 3/156  
                                        323/282  
8,581,508 B2 *   11/2013   Horino ................ H02M 1/4225  
                                        315/185 S (Continued)

FOREIGN PATENT DOCUMENTS

JP     2000-243583 A    9/2000  
JP     2008-311187 A    12/2008

(Continued)

OTHER PUBLICATIONS

International Search Report for corresponding International Application No. PCT/JP2013/006036 mailed Nov. 5, 2013.  
Form PCT/ISA/237 for corresponding International Application No. PCT/JP2013/006036 dated Nov. 5, 2013.

*Primary Examiner* — Thuy Vinh Tran  
(74) *Attorney, Agent, or Firm* — Renner, Otto, Boisselle & Sklar, LLP

(57) ABSTRACT

A lighting apparatus includes a chopper circuit and a control circuit that controls the chopper circuit. The control circuit includes a determining unit that determines a duty ratio of a dimming signal, and an output control unit that outputs a drive signal. The control circuit outputs a drive signal from the output control unit according to a result of a determination by the determining unit and causes the solid state light-emitting element to be lighted in a normal mode. In the charging mode, the control circuit sets an average value of a current flowing through an inductor to be higher than in the normal mode and charges a smoothing capacitor until a voltage across the smoothing capacitor reaches a prescribed voltage. When power is supplied, the control circuit charges the smoothing capacitor in the charging mode and subsequently lights the solid state light-emitting element in the normal mode.

20 Claims, 20 Drawing Sheets

(56) References Cited

U.S. PATENT DOCUMENTS

| | | | |
|---|---|---|---|
| 9,086,435 B2* | 7/2015 | Briggs | G01R 19/0092 |
| 2010/0033146 A1* | 2/2010 | Irissou | H02M 3/156 |
| | | | 323/282 |
| 2011/0057577 A1 | 3/2011 | Otake et al. | |
| 2011/0068706 A1 | 3/2011 | Otake et al. | |
| 2013/0193863 A1 | 8/2013 | Otake et al. | |
| 2013/0193880 A1 | 8/2013 | Otake et al. | |
| 2014/0132168 A1 | 5/2014 | Otake et al. | |
| 2014/0132170 A1 | 5/2014 | Otake et al. | |
| 2014/0132171 A1 | 5/2014 | Otake et al. | |

FOREIGN PATENT DOCUMENTS

| | | |
|---|---|---|
| JP | 2009-232625 A | 10/2009 |
| JP | 2010-287430 A | 12/2010 |
| JP | 2011-065922 A | 3/2011 |
| JP | 2011-205868 A | 10/2011 |
| JP | 2011-249174 A | 12/2011 |
| JP | 2012-059962 A | 3/2012 |

\* cited by examiner

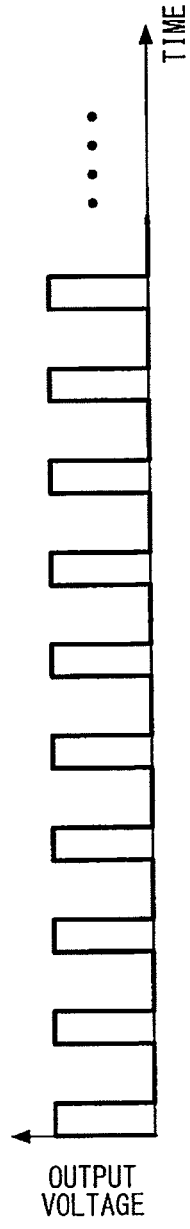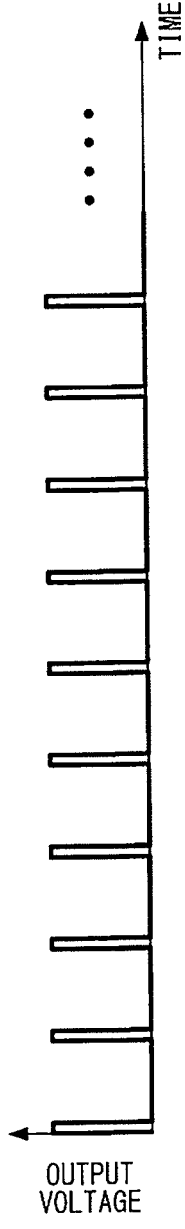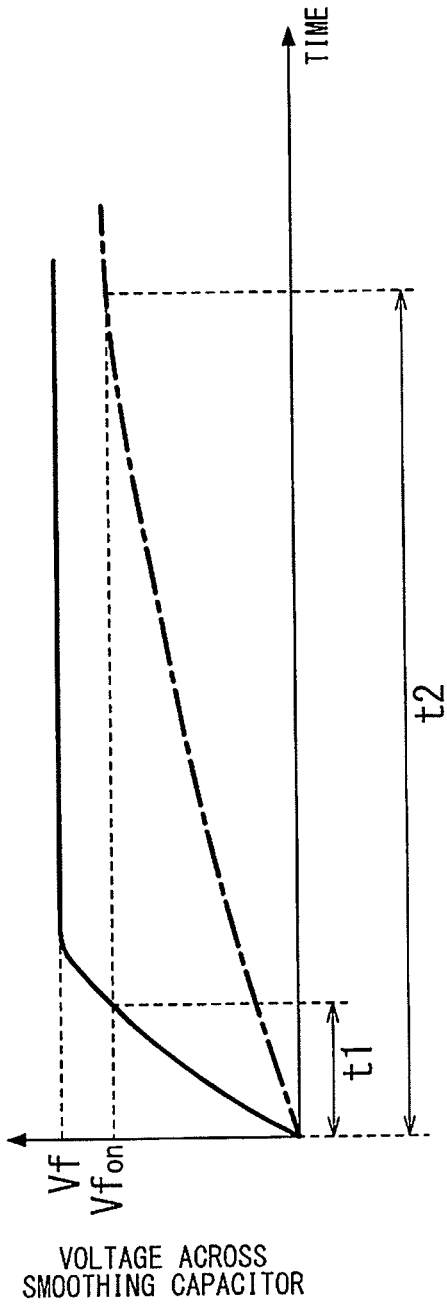
FIG. 4A
FIG. 4B
FIG. 4C

FIG. 5
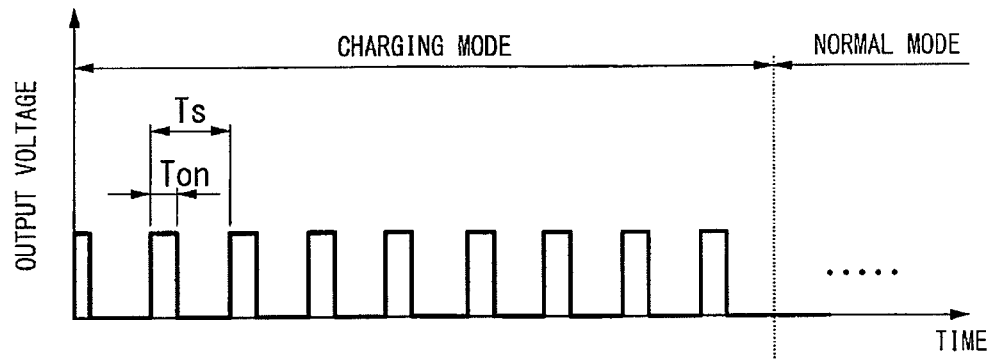
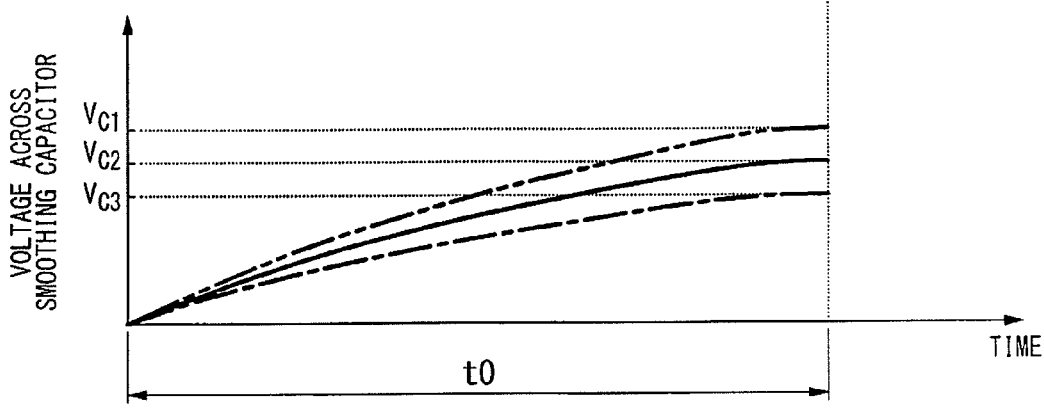
FIG. 6
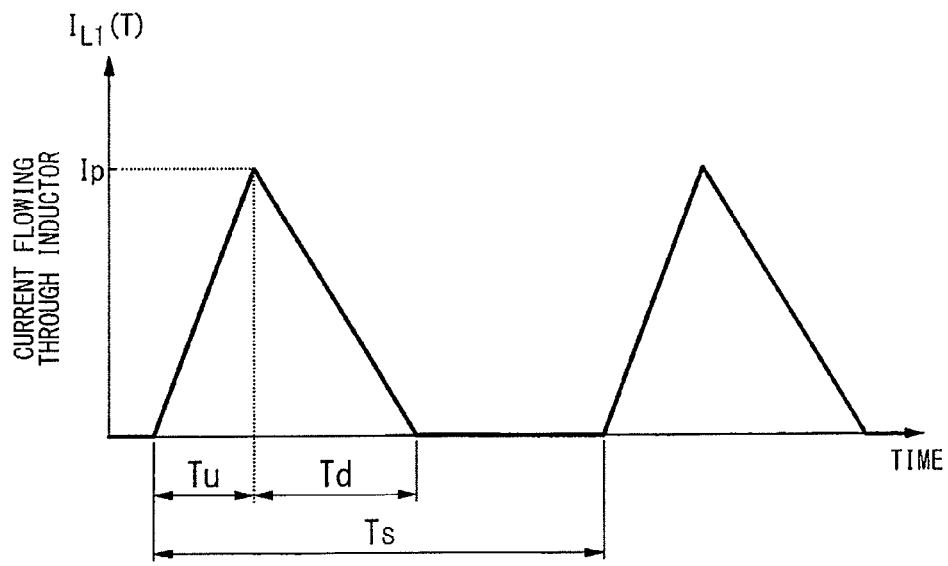

FIG. 7
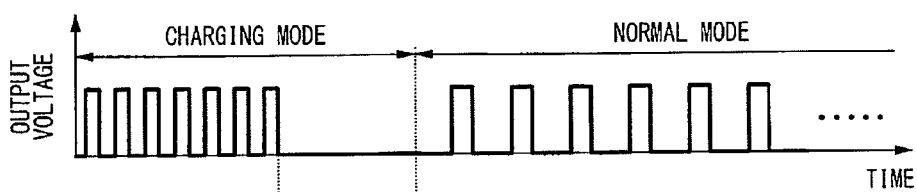
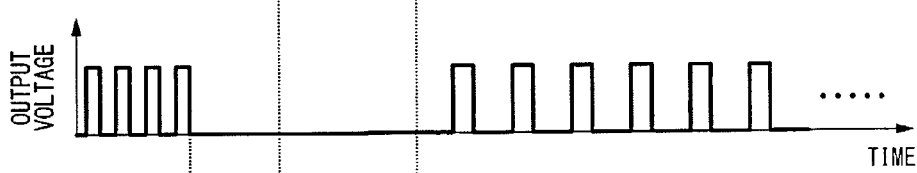
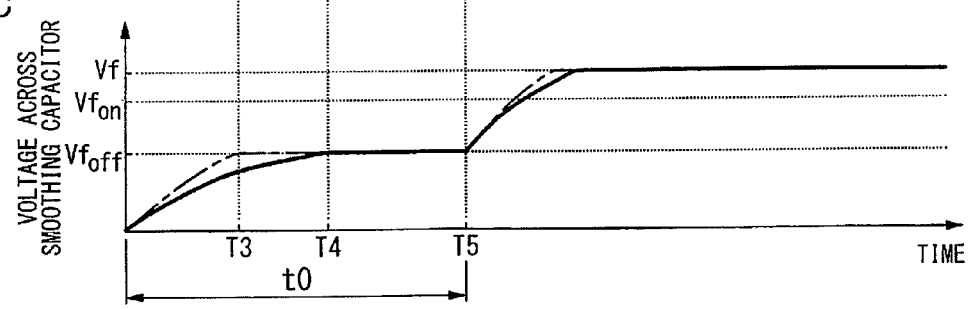
FIG. 8
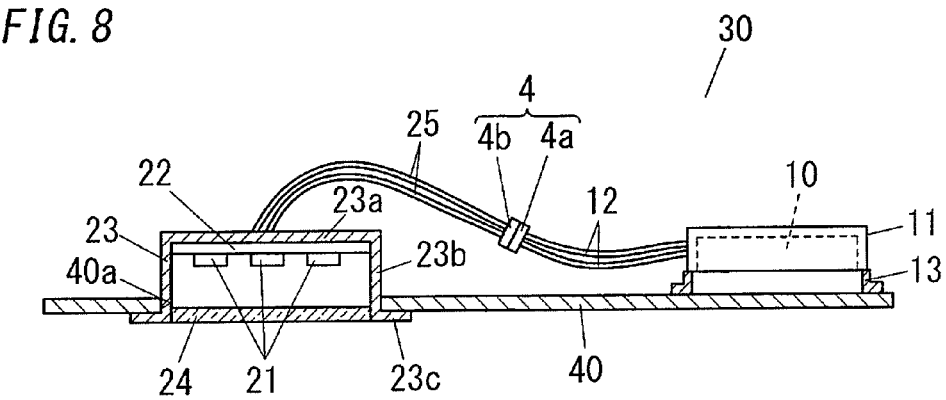

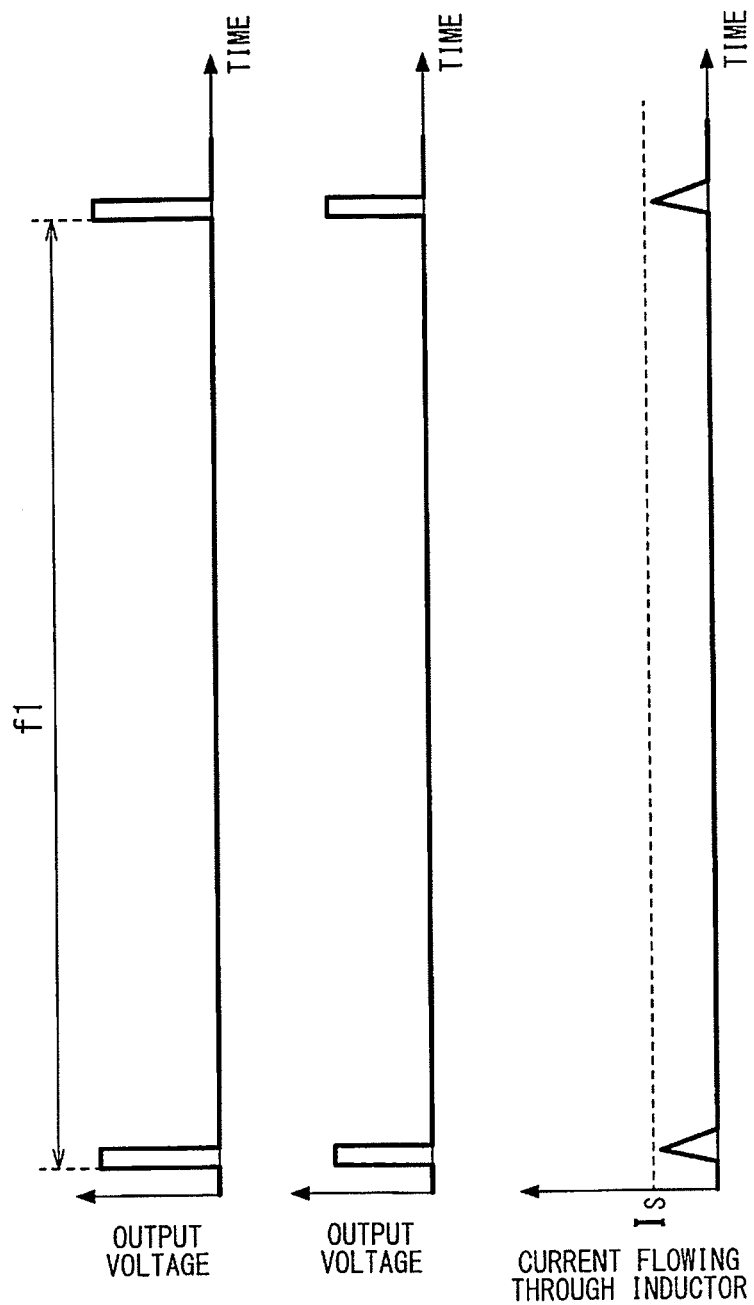

FIG. 18
A
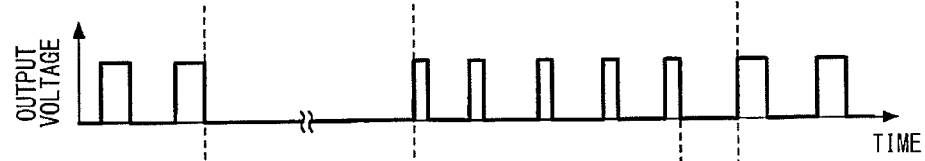
B
C
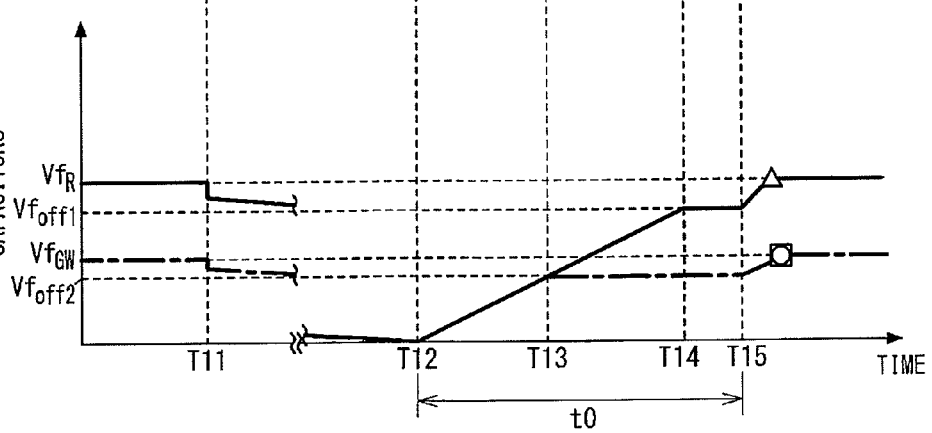

FIG. 21
A
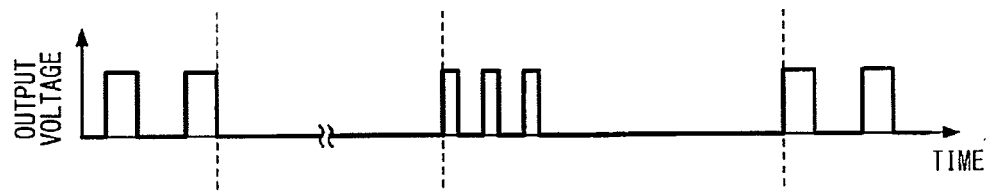
B
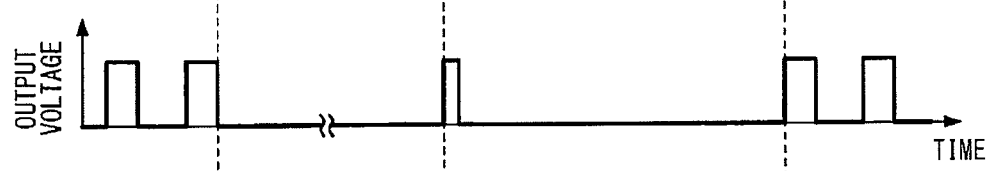
C
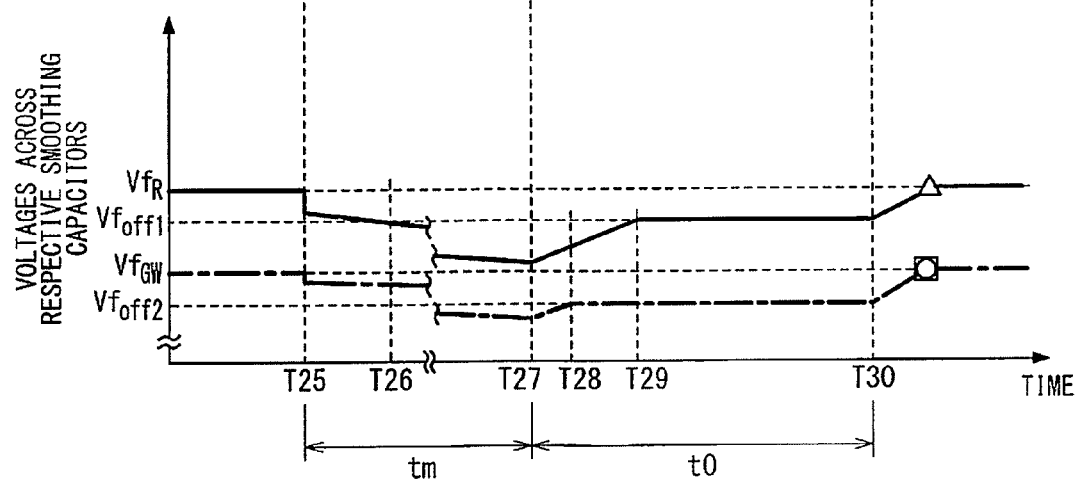

LIGHTING APPARATUS AND LIGHTING FIXTURE USING SAME

TECHNICAL FIELD

The present invention relates to a lighting apparatus and a lighting fixture using the lighting apparatus.

BACKGROUND ART

Conventionally, lighting apparatuses that dim a solid state light-emitting element such as a light-emitting diode according to a dimming signal from a dimmer are known.

As a lighting apparatus of this type, a power supply apparatus has been proposed which cancels a dimming signal for a predetermined period of time immediately after power-on to light a light-emitting diode at a prescribed light intensity and which removes the cancellation after a lapse of the predetermined period of time to light the light-emitting diode at a light intensity instructed by the dimming signal (JP 2009-232625 A1 (hereinafter, referred to as "Document 1")).

As shown in FIG. 23, the power supply apparatus disclosed in Document 1 includes a full-wave rectifying circuit 62, a ripple current smoothing capacitor 63, a switching transformer 64, a switching transistor 65, a control circuit 66, and a dimmer operating unit 67. The full-wave rectifying circuit 62 generates output that is a full-wave rectification of AC power from an AC power supply 61.

In addition, in the power supply apparatus described above, a rectifying smoothing circuit 70 including a diode 68 and a smoothing capacitor 69 is connected in parallel to a secondary winding 64b of the switching transformer 64. Furthermore, in the power supply apparatus, a plurality of (in the illustrated example, four) series-connected light-emitting diodes 71 to 74 are connected in parallel to the smoothing capacitor 69. Moreover, Document 1 discloses a lighting fixture to which the power supply apparatus described above is applied.

In the power supply apparatus described above, a series circuit which series-connects the plurality of light-emitting diodes 71 to 74 is connected between both ends of the smoothing capacitor 69. Therefore, when power is supplied to the power supply apparatus described above, it is estimated that the smoothing capacitor 69 is to be charged until a voltage across the smoothing capacitor 69 reaches a total voltage of forward voltage (forward direction voltage) of the respective light-emitting diodes 71 to 74. In this case, a charging time required to charge the smoothing capacitor 69 is determined by a magnitude of an average value of a current flowing through the secondary winding 64b of the switching transformer 64.

In addition, with the power supply apparatus described above, since the magnitude of the average value is determined by a duty ratio of a dimming signal from the dimmer operating unit 67, for example, when the respective light-emitting diodes 71 to 74 are dimmed at a dimming level that is a lower limit of dimming of the respective light-emitting diodes 71 to 74, the magnitude of the average value decreases. Therefore, with the power supply apparatus described above, when the respective light-emitting diodes 71 to 74 are dimmed at the dimming level described above, the charging time required to charge the smoothing capacitor 69 may increase and a period of time from an unlighted state to dimming of the respective light-emitting diodes 71 to 74 may become comparatively longer.

Furthermore, with the power supply apparatus described above, there is also a concern that a period of time required until the respective light-emitting diodes 71 to 74 are lighted may be further extended due to the cancellation of the dimming signal for a predetermined period of time immediately after power-on.

DISCLOSURE OF THE INVENTION

In consideration thereof, an object of the present invention is to provide a lighting apparatus capable of comparatively reducing a period of time from an unlighted state to dimming of a solid state light-emitting element when the solid state light-emitting element is dimmed at a dimming level that is a lower limit of dimming of the solid state light-emitting element from the unlighted state of the solid state light-emitting element, and a lighting fixture using the lighting apparatus.

A lighting apparatus according to the present invention is a lighting apparatus including at least one chopper circuit that includes a switching element, an inductor, a diode, and a smoothing capacitor, and a control circuit that controls the at least one chopper circuit. The control circuit includes: a determining unit configured to determine a duty ratio of a dimming signal that instructs a dimming level of a solid state light-emitting element provided in a subsequent stage of the at least one chopper circuit; and an output control unit configured to output a drive signal for driving the switching element. The control circuit has a normal mode and a charging mode as operating modes. The control circuit is configured to output the drive signal from the output control unit according to a determination result by the determining unit and to control the at least one chopper circuit to light the solid state light-emitting element in the normal mode, and configured to set an average value of a current flowing through the inductor to be higher than an average value of a current flowing through the inductor when the solid state light-emitting element is dimmed at a dimming level that is a lower limit of dimming in the normal mode, and to control the at least one chopper circuit to charge the smoothing capacitor until a voltage across the smoothing capacitor reaches a prescribed voltage that does not light the solid state light-emitting element in the charging mode. The control circuit is configured to control the at least one chopper circuit to charge the smoothing capacitor in the charging mode when power is supplied to the lighting apparatus, and to subsequently control the at least one chopper circuit to light the solid state light-emitting element in the normal mode.

According to another aspect of the present invention, favorably, the output control unit includes: a burst signal generating unit configured to generate a burst signal that is constituted by a PWM signal; a switching signal generating unit configured to generate a switching signal for turning on/off the switching element; and an output unit configured to generate the drive signal according to the burst signal from the burst signal generating unit and the switching signal from the switching signal generating unit and output the drive signal. Favorably, the burst signal generating unit is configured to generate a first burst signal that is the burst signal including a value of an off-duty ratio of the dimming signal as an on-duty ratio according to the determination result by the determining unit in the normal mode. Favorably, the burst signal generating unit is configured to generate a second burst signal that is the burst signal including an on-duty ratio that is greater than the on-duty ratio of the first burst signal when the determination result by the determining unit indicates the dimming level that is the lower limit of dimming in the charging mode.

According to another aspect of the present invention, favorably, the lighting apparatus includes a plurality of chopper circuits configured to individually light a plurality of light source units. Favorably, each of the plurality of light source units is formed by connecting a plurality of solid state light-emitting elements in series. Favorably, the plurality of chopper circuits are connected in parallel to one another. Each of the plurality of solid state light-emitting elements is the solid state light-emitting element. Favorably, the control circuit is configured to individually control the current flowing through the inductor in each of the plurality of chopper circuits in the charging mode.

According to another aspect of the present invention, favorably, the control circuit includes a detecting unit configured to detect the voltage across the smoothing capacitor. Favorably, the control circuit is configured to control the at least one chopper circuit to stop charging the smoothing capacitor or to charge the smoothing capacitor so as not to light the solid state light-emitting element when the voltage across the smoothing capacitor as detected by the detecting unit reaches the prescribed voltage in the charging mode.

According to another aspect of the present invention, favorably, the detecting unit includes a clocking unit configured to clock a period of time in which the current flowing through the inductor increases and a period of time in which the current flowing through the inductor decreases. Favorably, the control circuit is configured to calculate the voltage across the smoothing capacitor based on each period of time as clocked by the clocking unit.

According to another aspect of the present invention, favorably, a period of time in which the solid state light-emitting element is not lighted is provided after the voltage across the smoothing capacitor reaches the prescribed voltage and before making a transition to the normal mode.

According to another aspect of the present invention, favorably, the control circuit is configured to set a current peak value of the current flowing through the inductor in the charging mode to a current peak value which is equal to or lower than a rated current value of the inductor and which is higher than a current peak value of the current flowing through the inductor when the determination result by the determining unit indicates the dimming level that is the lower limit of dimming.

According to another aspect of the present invention, favorably, a period of time until the voltage across the smoothing capacitor reaches the prescribed voltage is longer than a period of time until the dimming signal input to the determining unit stabilizes.

According to another aspect of the present invention, favorably, the plurality of light source units are configured to radiate light of colors that differ from one another. Favorably, the control circuit is configured to individually control the current flowing through the inductor in each of the plurality of chopper circuits in the charging mode, and to control the plurality of chopper circuits so that light respectively radiated from the plurality of light source units are mixed to produce a prescribed mixed-color light in the normal mode. Favorably, the control circuit is configured to control the plurality of chopper circuits to charge the smoothing capacitor of each of the plurality of chopper circuits in the charging mode when the dimming signal is input after the plurality of light source units are turned off and to subsequently control the plurality of chopper circuits to light the plurality of light source units in the normal mode.

According to another aspect of the present invention, favorably, the control circuit is configured to control the plurality of chopper circuits to charge each smoothing capacitor in the charging mode after a certain period of time has lapsed from turning off the plurality of light source units, when controlling the plurality of chopper circuits to light the plurality of light source units based on the dimming signal after turning the plurality of light source units off. Favorably, the certain period of time is longer than a period of time until the voltage across each smoothing capacitor falls below the prescribed voltage.

A lighting fixture according to the present invention includes: the solid state light-emitting element; and the lighting apparatus configured to light the solid state light-emitting element.

With the lighting apparatus according to the present invention, when dimming the solid state light-emitting element at the dimming level that is the lower limit of dimming of the solid state light-emitting element from the unlighted state of the solid state light-emitting element, the period of time from the unlighted state to dimming can be comparatively reduced.

With the lighting fixture according to the present invention, when dimming the solid state light-emitting element at the dimming level that is the lower limit of dimming of the solid state light-emitting element from the unlighted state of the solid state light-emitting element, the period of time from the unlighted state to dimming can be comparatively reduced.

BRIEF DESCRIPTION OF THE DRAWINGS

Preferred embodiments of the present invention will now be described in further detail. These and other features and advantages of the present invention will become more fully apparent as the following detailed description is read in light of the accompanying drawings, in which:

FIG. 4A is an explanatory diagram of a drive signal when fully lighted in another lighting apparatus according to the first embodiment, FIG. 4B is an explanatory diagram of a drive signal when dimming at a dimming level that is a lower limit of dimming in the another lighting apparatus according to the first embodiment, and FIG. 4C is a correlation diagram between a voltage across a smoothing capacitor and a period of time from an unlighted state to lighting of a solid state light-emitting element in the another lighting apparatus according to the first embodiment;

FIG. 5 relates to the lighting apparatus according to the first embodiment, in which "A" of FIG. 5 is an explanatory diagram of a drive signal and "B" of FIG. 5 is a correlation diagram between a voltage across a smoothing capacitor and a period of time required to charge the smoothing capacitor;

FIG. 6 is an explanatory diagram of a current flowing through an inductor in the lighting apparatus according to the first embodiment;

FIG. 7 relates to the lighting apparatus according to the first embodiment, in which "A" and "B" of FIG. 7 are explanatory diagrams of a drive signal and "C" of FIG. 7 is a correlation diagram between a voltage across a smoothing capacitor and a period of time from an unlighted state to lighting of a solid state light-emitting element;

FIG. 8 is a schematic configuration diagram of a lighting fixture according to the first embodiment;

FIG. 11A is an explanatory diagram of a third burst signal in another lighting apparatus according to the third embodiment, FIG. 11B is an explanatory diagram of a fourth drive signal in the another lighting apparatus according to the third embodiment, and FIG. 11C is an explanatory diagram of a current flowing through an inductor in the another lighting apparatus according to the third embodiment;

FIG. 18 relates to an example of a case of turning off respective light source units and subsequently turning on the respective light source units based on a dimming signal in another lighting apparatus according to the fourth embodiment, in which "A" and "B" of FIG. 18 are explanatory diagrams of respective drive signals and "C" of FIG. 18 is a correlation diagram between voltages across the respective smoothing capacitors and periods of time from an unlighted state to lighting of respective solid state light-emitting elements;

FIG. 21 relates to an example of a case of turning off respective light source units and subsequently turning on the respective light source units based on a dimming signal in yet another lighting apparatus according to the fourth embodiment, in which "A" and "B" of FIG. 21 are explanatory diagrams of respective drive signals and "C" of FIG. 21 is a correlation diagram between voltages across the respective smoothing capacitors and periods of time from an unlighted state to lighting of respective solid state light-emitting elements;

Figure 1:
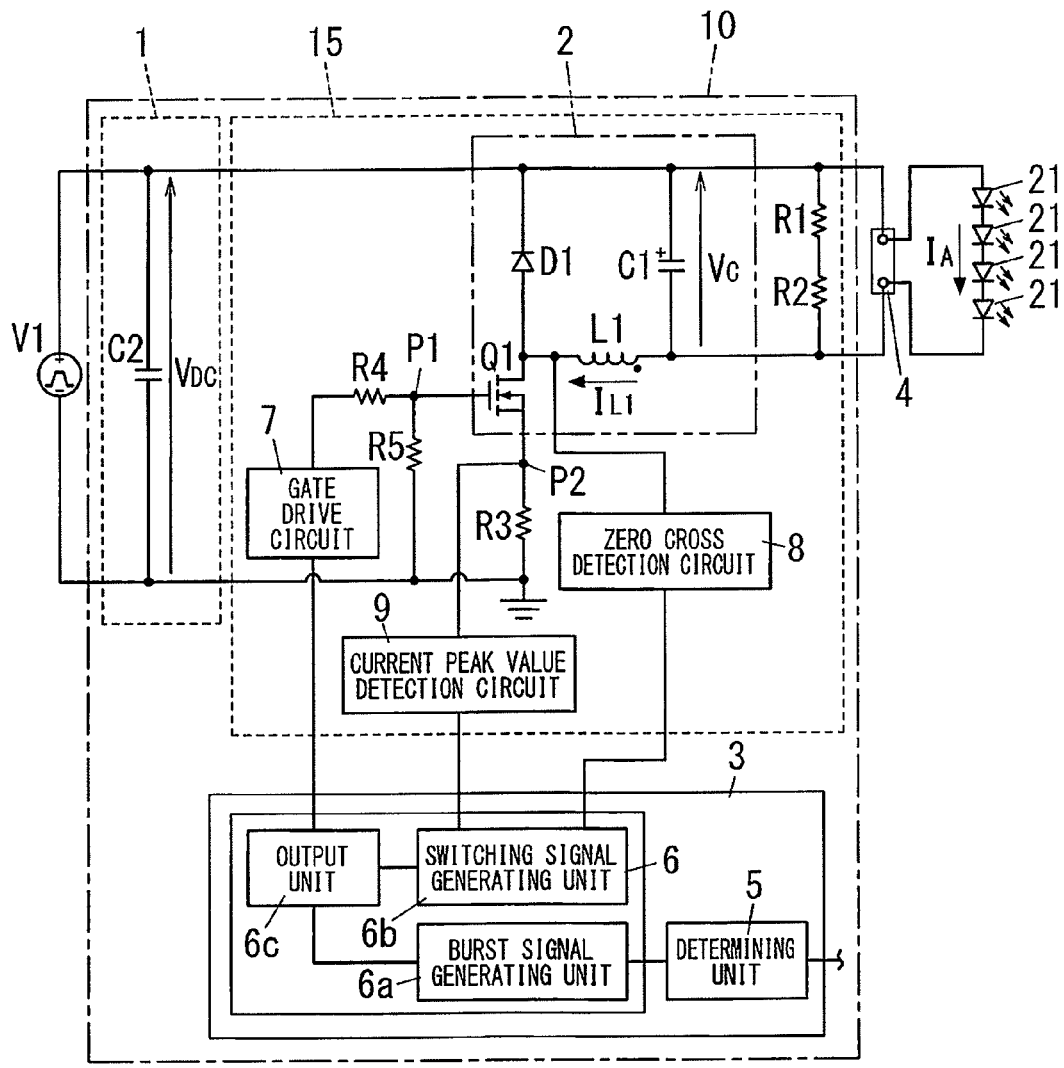
FIG. 1 is a schematic configuration diagram of a lighting apparatus according to a first embodiment.

BEST MODE FOR CARRYING OUT THE INVENTION (First Embodiment)

Hereinafter, a lighting apparatus according to the present embodiment will be described with reference to FIGS. 1 to 7.

A lighting apparatus 10 according to the present embodiment is configured to light a solid state light-emitting element 21 that is a light-emitting diode (hereinafter referred to as an "LED") or the like.

In the present embodiment, an LED is adopted as the solid state light-emitting element 21. In addition, in the present embodiment, an emission color of the solid state light-emitting element 21 is set to white. Furthermore, in the present embodiment, the solid state light-emitting element 21 is provided in plurality (in FIG. 1, four) and an electric connection relationship among the respective solid state light-emitting elements 21 is assumed to be a series connection. Although the electric connection relationship among the respective solid state light-emitting elements 21 is assumed to be a series connection in the present embodiment, the electric connection relationship is not limited to a series connection. Alternatively, the electric connection relationship may be a parallel connection or a connection combining a series connection and a parallel connection. In addition, while the solid state light-emitting element 21 is provided in plurality in the present embodiment, only one solid state light-emitting element 21 may be provided instead. Furthermore, while an LED is adopted as the solid state light-emitting element 21 in the present embodiment, the solid state light-emitting element 21 is not limited to an LED and a semiconductor laser element, an organic electroluminescence element, and the like may be adopted instead. In addition, when an LED is adopted as the solid state light-emitting element 21, the lighting apparatus 10 may be configured to utilize light emitted by an LED chip without modification. Alternatively, when an LED is adopted as the solid state light-emitting element 21, the lighting apparatus 10 may be configured to convert the wavelength of part of the light from an LED chip with a wavelength converting member and utilize light that is a mixture of the light emitted by the LED chip and light emitted by the wavelength converting member. The same description will also apply to the other embodiments described below.

The lighting apparatus 10 according to the present embodiment includes a chopper circuit 2 including a switching element Q1, an inductor L1, a diode D1, and a smoothing capacitor C1, and a control circuit 3 that controls the chopper circuit 2. In addition, the lighting apparatus 10 includes a power supply circuit 1 that supplies a DC voltage $V_{DC}$ to the chopper circuit 2.

The power supply circuit 1 includes a capacitor C2 that smooths an output voltage from a DC power supply V1. Moreover, in the present embodiment, a switch (not shown) for enabling/disabling the supply of power to the lighting apparatus 10 is provided on a power supply path between the DC power supply V1 and the capacitor C2. In addition, while power is supplied to the lighting apparatus 10 from the DC power supply, alternatively, power may be supplied from a commercial power supply or the like. In this case, for example, the power supply circuit 1 may be provided with an AC-DC conversion circuit or the like that converts an AC voltage from the commercial power supply to a DC voltage.

The chopper circuit 2 may be constituted by, for example, a back converter.

As the switching element Q1, for example, a MOSFET (Metal-Oxide-Semiconductor Field-effect Transistor) can be adopted. In the present embodiment, for example, an n-channel MOSFET is adopted as the switching element Q1.

As the inductor L1, for example, a choke coil can be adopted.

As the smoothing capacitor C1, for example, an electrolytic capacitor can be adopted.

A cathode side of the diode D1 is connected to a high potential side of the capacitor C2 of the power supply circuit 1. In addition, a cathode side of the diode D1 is connected to a high potential side of the smoothing capacitor C1. An anode side of the diode D1 is connected to a first main terminal (in the present embodiment, a drain terminal) of the switching element Q1. The drain terminal of the switching element Q1 is connected to a first end of the inductor L1. A second end of the inductor L1 s connected to a low potential side of the smoothing capacitor C1.

A second main terminal (in the present embodiment, a source terminal) of the switching element Q1 is connected to a first end of a resistor R3. A second end of the resistor R3 s connected to a low potential side of the capacitor C2. In addition, a second end of the resistor R3 is grounded.

In the lighting apparatus 10, a series circuit constituted by the resistor R1 and the resistor R2 is connected in parallel to the smoothing capacitor C1. Therefore, in the lighting apparatus 10 according to the present embodiment, when supply of power to the lighting apparatus 10 is disabled by the switch described above, a charge accumulated in the smoothing capacitor C1 in advance can be discharged by the series circuit constituted by the resistor R1 and the resistor R2. Accordingly, with the lighting apparatus 10, the respective solid state light-emitting elements 21 can be turned off quicker as compared to a configuration in which the series circuit constituted by the resistor R1 and the resistor R2 is not connected in parallel to the smoothing capacitor C1.

In addition, in the lighting apparatus 10, a connector 4 is electrically connected between both ends of the series circuit constituted by the resistor R1 and the resistor R2. In this case, in the lighting apparatus 10, a series circuit in which the plurality of solid state light-emitting elements 21 are connected in series is electrically connected to the lighting apparatus 10 via the connector 4. Therefore, with the lighting apparatus 10 according to the present embodiment, since the series circuit constituted by the plurality of solid state light-emitting elements 21 is connected in parallel to the smoothing capacitor C1, an occurrence of a ripple in a current $I_A$ flowing through each solid state light-emitting element 21 can be suppressed. As a result, with the lighting apparatus 10, the generation of flicker or fringes in video captured by an imaging apparatus such as a video camera can be prevented in an environment in which the respective solid state light-emitting elements 21 are lighted by the lighting apparatus 10.

Moreover, while the chopper circuit 2 is constituted by a back converter in the present embodiment, the chopper circuit 2 is not limited to a back converter. For example, the chopper circuit 2 may alternatively be constituted by a flyback converter or a forward converter.

The control circuit 3 can be configured by, for example, loading an appropriate program on a microcomputer. Moreover, while a microcomputer is used as the control circuit 3 in the present embodiment, the control circuit 3 is not limited to a microcomputer. For example, a controlling IC (Integrated Circuit) may be used instead.

In addition, the control circuit 3 includes a determining unit 5 that determines a duty ratio (in the present embodiment, an on-duty ratio) of a dimming signal and an output control unit 6 that outputs a drive signal. A dimming signal is a signal that instructs a dimming level of each solid state light-emitting element 21. A drive signal is a signal for driving the switching element Q1. Moreover, in the lighting apparatus 10 according to the present embodiment, for example, a DC-DC conversion circuit (not shown) or the like that converts the DV voltage $V_{DC}$ from the power supply circuit 1 to a prescribed DC voltage and supplies the DC voltage to the control circuit 3 is adopted as a unit configured to supply power to the control circuit 3.

The determining unit 5 is provided with a first clocking unit (not shown) that clocks, for example, a high-level period corresponding to one cycle of a dimming signal from a dimmer (not shown). As the first clocking unit, for example, a counter (not shown) built into the microcomputer that is used as the control circuit 3 may be adopted.

Furthermore, a first dimming table that includes first dimming data is stored in advance in the determining unit 5. The first dimming data is data in which a period of time that is clocked by the first clocking unit and an on-duty ratio of a dimming signal are associated with each other.

The determining unit 5 is configured to determine an on-duty ratio of a dimming signal corresponding to a period clocked by the first clocking unit based on the first dimming table. In addition, the determining unit 5 is configured to output the on-duty ratio as a result of the determination to the output control unit 6.

While the determining unit 5 determines an on-duty ratio of a dimming signal in the present embodiment, the determining unit 5 is not limited to determining an on-duty ratio. Alternatively, the determining unit 5 may determine an off-duty ratio of a dimming signal. In this case, the first clocking unit may clock a low-level period corresponding to one cycle of a dimming signal.

The output control unit 6 includes a burst signal generating unit 6a that generates a burst signal constituted by a PWM signal and a switching signal generating unit 6b that generates a switching signal for turning on/off the switching element Q1. In addition, the output control unit 6 includes an output unit 6c that outputs the drive signal described earlier. Moreover, in the present embodiment, for example, PWM signals are used as a switching signal and a drive signal.

The output unit 6c is provided with a computing unit (not shown) that computes a logical AND of a burst signal from the burst signal generating unit 6a and a switching signal from the switching signal generating unit 6b. As the computing unit, for example, an AND circuit may be adopted.

The output unit 6c is configured to generate a drive signal according to a result of a computation performed by the computing unit. In other words, the output unit 6c is configured to generate a drive signal according to a burst signal from the burst signal generating unit 6a and a switching signal from the switching signal generating unit 6b.

In addition, the lighting apparatus 10 includes a gate drive circuit 7 that drives (turns on/off) the switching element Q1 according to a drive signal from the output unit 6c and a zero cross detection circuit 8 that detects a zero crossing point of a current $I_{L1}$ flowing through the inductor L1. Furthermore, the lighting apparatus 10 includes a current peak value detection circuit 9 that detects a current peak value of the current $I_{L1}$ flowing through the inductor L1.

As the gate drive circuit 7, for example, a generic pre-driver IC or the like that drives the switching element Q1 can be adopted. The gate drive circuit 7 is connected to the output unit 6c of the control circuit 3. In addition, the gate drive circuit 7 is connected to a first end of a resistor R4. A second end of the resistor R4 s connected to a first end of a resistor R5. A second end of the resistor R5 s connected to a low potential side of the capacitor C2. In the lighting apparatus 10, a connection point P1 between the resistor R4 and the resistor R5 is connected to a control terminal (in the present embodiment, a gate terminal) of the switching element Q1. In this case, the lighting apparatus 10 is configured so that a voltage across the resistor R5 is applied to the gate terminal of the switching element Q1. In other words, in the lighting apparatus 10, a series circuit including the resistor R4 and the resistor R5 constitutes a resistance voltage divider circuit. Moreover, in the lighting apparatus 10 according to the present embodiment, the chopper circuit 2, the gate drive circuit 7, the zero cross detection circuit 8, the current peak value detection circuit 9, and the respective resistors R1 to R5 constitute a lighting circuit 15 that lights the respective solid state light-emitting elements 21.

The zero cross detection circuit 8 is connected to the first end of the inductor L1 of the chopper circuit 2. In addition, the zero cross detection circuit 8 is connected to the switching signal generating unit 6b of the control circuit 3.

Furthermore, the zero cross detection circuit 8 is configured to output a first detected signal to the switching signal generating unit 6b when a current value of the current $I_{L1}$ that flows through the inductor L1 is zero. The first detected signal is a signal indicating a zero crossing point of the current $I_{L1}$ that flows through the inductor L1. Moreover, in the present embodiment, for example, a PWM signal is used as the first detected signal.

In the present embodiment, the zero cross detection circuit 8 is connected to the first end of the inductor L1. However, the connection of the zero cross detection circuit 8 is not limited thereto. For example, a secondary winding corresponding to the inductor L1 that constitutes a primary winding may be provided, in which case the zero cross detection circuit 8 may be connected to a first end of the secondary winding. In this case, a second end of the secondary winding may be grounded.

The current peak value detection circuit 9 is connected to a connection point P2 between the source terminal of the switching element Q1 and the resistor R3. In addition, the current peak value detection circuit 9 is connected to the switching signal generating unit 6b. In the present embodiment, the resistor R3 constitutes a resistor for detecting the current $I_{L1}$ that flows through the inductor L1. Furthermore, in the present embodiment, a threshold for detecting a current peak value of the current $I_{L1}$ that flows through the inductor L1 is set in advance to the current peak value detection circuit 9.

In addition, the current peak value detection circuit 9 is configured to output a second detected signal to the switching signal generating unit 6b when the current $I_{L1}$ that flows through the inductor L1 is equal to the threshold set in advance. The second detected signal is a signal indicating a current peak value of the current $I_{L1}$ that flows through the inductor L1. Moreover, in the present embodiment, for example, a PWM signal is used as the second detected signal. Furthermore, while the current peak value detection circuit 9 is connected to the connection point P2 in the present embodiment, this configuration is not restrictive. For example, a configuration may be adopted in which a current peak value of the current $I_{L1}$ that flows through the inductor L1 is detected by connecting a first end of a resistor (a bypass resistor) to the connection point P2 and connecting the control circuit 3 to a second end of the resistor. In this case, the threshold may be set in advance to the control circuit 3.

In the lighting apparatus 10 according to the present embodiment, the control circuit 3 includes a normal mode as an operating mode. The control circuit 3 is configured to output a drive signal from the output control unit 6 according to a result of the determination by the determining unit 5 and to control the chopper circuit 2 to light the respective solid state light-emitting elements 21 in the normal mode.

When the control circuit 3 is in the normal mode, the burst signal generating unit 6a generates the burst signal described earlier (hereinafter, referred to as a "first burst signal") according to a result of the determination by the determining unit 5. The first burst signal includes a value of an off-duty ratio of a dimming signal as an on-duty ratio.

Hereinafter, operations in the lighting apparatus 10 according to the present embodiment when the control circuit 3 is in the normal mode will be briefly described.

When power is supplied to the lighting apparatus 10 and a dimming signal is input from the dimmer described earlier, the determining unit 5 determines a duty ratio of the dimming signal. In addition, the determining unit 5 outputs the duty ratio of the dimming signal as a result of the determination to the burst signal generating unit 6a.

The burst signal generating unit 6a generates a first burst signal according to the determination result from the determining unit 5. In addition, the burst signal generating unit 6a outputs the generated first burst signal to the output unit 6c.

The switching signal generating unit 6b generates the switching signal described earlier (hereinafter, referred to as a "first switching signal") according to a first detected signal from the zero cross detection circuit 8 and a second detected signal from the current peak value detection circuit 9. In addition, the switching signal generating unit 6b outputs the generated first switching signal to the output unit 6c.

The output unit 6c computes a logical AND of the first burst signal from the burst signal generating unit 6a and the first switching signal from the switching signal generating unit 6b with the computing unit. In addition, the output unit 6c generates the drive signal described earlier (hereinafter, referred to as a "first drive signal") according to the results of the computation. Furthermore, the output unit 6c outputs the generated first drive signal to the gate drive circuit 7.

The gate drive circuit 7 drives (turns on/off) the switching element Q1 according to the first drive signal from the output unit 6c.

In the lighting apparatus 10, when the switching element Q1 changes from an off-state to an on-state, a current flows along a path that sequentially follows the high potential side of the capacitor C2 of the power supply circuit 1, the smoothing capacitor C1, the inductor L1, the switching element Q1, the resistor R3, and the low potential side of the capacitor C2. Accordingly, in the lighting apparatus 10, the smoothing capacitor C1 is charged. As a result, in the lighting apparatus 10, when a voltage $V_C$ across the smoothing capacitor C1 reaches a total voltage of forward voltages (forward direction voltages) of the respective solid state light-emitting elements 21, the respective solid state light-emitting elements 21 can be lighted.

Figure 2:
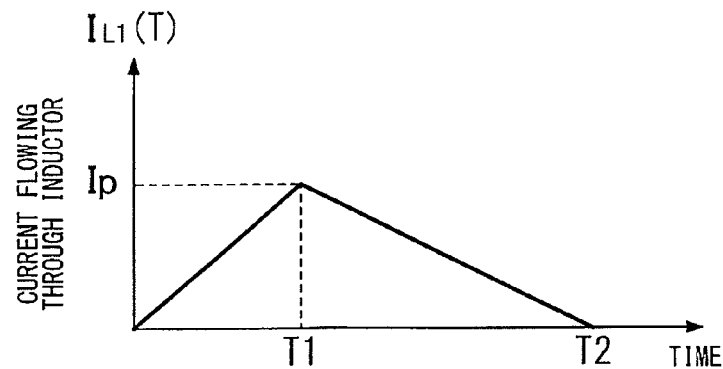
FIG. 2 is an explanatory diagram of a current flowing through an inductor in the lighting apparatus according to the first embodiment.

In the lighting apparatus 10 according to the present embodiment, when the switching element Q1 changes from an off-state to an on-state, the current $I_{L1}$ that flows through the inductor L1 increases with time as shown in FIG. 2 and electromagnetic energy $\{L \times I_{L1}(T)^2\}$ is accumulated in the inductor L1, where L denotes an inductance of the inductor L1 and $I_{L1}(T)$ denotes a current value of the current $I_{L1}$ that flows through the inductor L1 at time T. In addition, $I_P$ in FIG. 2 represents a current peak value of the current $I_{L1}$ that flows through the inductor L1. Furthermore, T1 in FIG. 2 represents a time point of a current peak value of the current $I_{L1}$ that flows through the inductor L1. Moreover, T2 in FIG. 2 represents a time point at which a current value of the current $I_{L1}$ that flows through the inductor L1 is zero.

In addition, in the lighting apparatus 10 according to the present embodiment, when the switching element Q1 changes from an on-state to an off-state, the electromagnetic energy described above that is accumulated in advance in the inductor L1 is discharged and a back electromotive voltage is generated in the inductor L1. Furthermore, in the lighting apparatus 10, when a back electromotive voltage is generated in the inductor L1, a current flows along a path that sequentially follows the first end of the inductor L1, the diode D1, the smoothing capacitor C1, and the second end of the inductor L1. Accordingly, in the lighting apparatus 10, the smoothing capacitor C1 is charged. Therefore, with the lighting apparatus 10, the voltage $V_C$ across the smoothing capacitor C1 can be maintained so as to equal or exceed the total voltage of forward voltages of the respective solid state light-emitting elements 21 and a lighted state of the respective solid state light-emitting elements 21 can be maintained. In this case, in the lighting apparatus 10 according to the present embodiment, the electromagnetic energy described above that is accumulated in advance in the inductor L1 is charged to the smoothing capacitor C1 as $C \times [\{V_C(T2)\}^2 - \{V_C(T2)\}^2]$, where C denotes a capacitance of the smoothing capacitor C1, $V_C(T2)$ denotes a voltage across the smoothing capacitor C1 when a current value of the current $I_{L1}$ that flows through the inductor L1 is zero, and $V_C(T1)$ denotes a voltage across the smoothing capacitor C1 when the current $I_{L1}$ that flows through the inductor L1 is at the current peak value.

In the lighting apparatus 10 according to the present embodiment, when the switching element Q1 changes from an on-state to an off-state, the current $I_{L1}$ that flows through the inductor L1 decreases with time as shown in FIG. 2.

With the lighting apparatus 10 according to the present embodiment, as the switching element Q1 is repetitively turned on and off, the current $I_{L1}$ that flows through the inductor L1 increases and decreases with time.

The control circuit 3 includes a charging mode as an operating mode in addition to the normal mode described above. In the charging mode, the control circuit 3 is configured to set an average value of the current $I_{L1}$ that flows through the inductor L1 to be higher than an average value of the current $I_{L1}$ that flows through the inductor L1 when dimming each solid state light-emitting element 21 at a dimming level that is a lower limit of dimming in the normal mode, and to control the chopper circuit 2 to charge the smoothing capacitor C1 until the voltage $V_C$ across the smoothing capacitor C1 reaches a prescribed voltage $Vf_{off}$ (refer to FIG. 3B) that does not light the solid state light-emitting element 21. Moreover, Vf in FIG. 3B denotes a rated forward voltage of the solid state light-emitting element 21. In addition, $Vf_{ON}$ in FIG. 3B denotes a voltage at which the solid state light-emitting element 21 is lighted.

In the lighting apparatus 10, the prescribed voltage $Vf_{off}$ is set to a voltage calculated as [voltage at which solid state light-emitting element 21 is reliably turned off]×[the number of solid state light-emitting elements 21].

The present inventors have experimentally confirmed that adopting a voltage around 70% of the rated forward voltage of the solid state light-emitting element 21 as the voltage at which the solid state light-emitting element 21 is reliably turned off may suffice. In addition, the present inventors have contemplated setting the voltage at which the solid state light-emitting element 21 is reliably turned off to 60% of the rated forward voltage of the solid state light-emitting element 21 in further consideration of variations among the solid state light-emitting elements 21. Therefore, in the lighting apparatus 10, the prescribed voltage $Vf_{off}$ is set to a voltage calculated as [voltage equivalent to 60% of rated forward voltage of solid state light-emitting element 21]×[the number of solid state light-emitting elements 21].

The control circuit 3 is configured to control the chopper circuit 2 to charge the smoothing capacitor C1 in the charging mode when power is supplied to the lighting apparatus 10.

The control circuit 3 is provided with a second clocking unit (not shown) that clocks a period of time from the time when power is supplied to the lighting apparatus 10 to the present time (hereinafter, referred to as a "startup time"). As the second clocking unit, for example, a counter (not shown) built into the microcomputer that is used as the control circuit 3 may be adopted.

In addition, a period of time t0 (refer to FIG. 3B) that is required by the voltage $V_C$ across the smoothing capacitor C1 to equal the prescribed voltage $Vf_{off}$ from 0 V is set to the control circuit 3 in advance. Hereinafter, in the present embodiment, for convenience of explanation, the period of time t0 that is required by the voltage $V_C$ across the smoothing capacitor C1 to equal the prescribed voltage $Vf_{off}$ from 0 V may also be referred to as a charging time t0 for charging the smoothing capacitor C1.

The second clocking unit is configured to start clocking of the startup time when power is supplied to the lighting apparatus 10.

The burst signal generating unit 6a is configured to ignore the determination result described earlier from the determining unit 5 until the startup time that is clocked by the second clocking unit reaches the charging time t0 set to the control circuit 3 in advance. In this case, the determining unit 5 is configured to continue outputting the determination result described earlier to the burst signal generating unit 6a until the startup time that is clocked by the second clocking unit reaches the charging time t0 set to the control circuit 3 in advance.

In addition, the burst signal generating unit 6a is configured to generate a burst signal (hereinafter, referred to as a "second burst signal") including a larger on-duty ratio than an on-duty ratio of the first burst signal when the determination result by the determining unit 5 indicates the dimming level that is the lower limit of dimming until the startup time that is clocked by the second clocking unit reaches the charging time t0 set to the control circuit 3 in advance. Furthermore, the burst signal generating unit 6a is configured to output the generated second burst signal to the output unit 6c. Accordingly, the burst signal generating unit 6a can set an average value of the current $I_{L1}$ flowing through the inductor L1 to be greater than an average value of the current $I_{L1}$ that flows through the inductor L1 when dimming each solid state light-emitting element 21 at a dimming level that is a lower limit of dimming in the normal mode. Moreover, in the present embodiment, for example, a PWM signal is used as the second burst signal. In addition, in the present embodiment, a frequency of the first burst signal and a frequency of the second burst signal are set to a same frequency.

The switching signal generating unit 6b is configured to generate the second switching signal until the startup time that is clocked by the second clocking unit reaches the charging time t0 set to the control circuit 3 in advance. In addition, the switching signal generating unit 6b is configured to output the generated second switching signal to the output unit 6c. As the second switching signal, for example, a PWM signal can be used.

If L denotes an inductance of the inductor L1, $I_P$ denotes a current peak value of the current $I_{L1}$ that flows through the inductor L1, $V_{DC}$ denotes an input voltage of the chopper circuit 2, and $V_A$ denotes a voltage value of the voltage $V_C$ across the smoothing capacitor C1, then an on-width $t_{ON}$ of the second switching signal can be obtained by the following equation.

[Math 1]

$$t_{ON} = I_P \times \frac{L}{V_{DC} - V_A} \quad \text{Equation (1)}$$

With the lighting apparatus 10 according to the present embodiment, when the voltage $V_C$ across the smoothing capacitor C1 upon power being supplied to the lighting apparatus 10 is 0 V, the on-width $t_{ON}$ of the second switching signal can be obtained by the following equation.

[Math 2]

$$t_{ON} = I_P \times \frac{L}{V_{DC}} \quad \text{Equation (2)}$$

The output unit 6c is configured to compute a logical AND of the second burst signal from the burst signal generating unit 6a and the second switching signal from the switching signal generating unit 6b with the computing unit described above. In addition, the output unit 6c is configured to generate a drive signal (hereinafter, referred to as a "second drive signal") according to the results of the computation. Furthermore, the output unit 6c is configured to output the generated second drive signal to the gate drive circuit 7. Moreover, in the present embodiment, for example, a PWM signal is used as the second drive signal.

In the lighting apparatus 10 according to the present embodiment, when the control circuit 3 is in the charging mode, the burst signal generating unit 6a generates a second burst signal and outputs the second burst signal to the output unit 6c. Accordingly, with the lighting apparatus 10 according to the present embodiment, an average value of the current $I_{L1}$ that flows through the inductor L1 can be set larger than in the normal mode. As a result, with the lighting apparatus 10, compared to a case in which the smoothing capacitor C1 is charged only by an operation in the normal mode, the charging time t0 required to charge the smoothing capacitor C1 can be reduced and the smoothing capacitor C1 can be charged comparatively quicker.

The present inventors have confirmed that, with the lighting apparatus 10 according to the present embodiment, for example, when respectively setting an input voltage of the chopper circuit 2 to 24 [V], an inductance of the inductor L1 to 68 [µH], the on-width $t_{ON}$ of the second switching signal to 5 [µs], a forward voltage of each solid state light-emitting element 21 to 3.3 [V], and a capacitance of the smoothing capacitor C1 to 330 [µF], the charging time t0 required to charge the smoothing capacitor C1 can be obtained through simulation as approximately 200 [ms]. Moreover, when performing the simulation, the present inventors used a circuit simulator or the like.

In addition, the present inventors have confirmed through the simulation described above that setting the on-duty ratio of the second burst signal to an on-duty ratio that is twice the on-duty ratio of the first burst signal results in a charging time t0 required to charge the smoothing capacitor C1 of approximately 100 [ms]. Furthermore, the present inventors have experimentally confirmed that, in the lighting apparatus 10, by setting the on-duty ratio of the second burst signal to an on-duty ratio that is twice the on-duty ratio of the first burst signal, the charging time t0 of the smoothing capacitor C1 can be reduced to ½ without having to change a current peak value of the current $I_{L1}$ that flows through the inductor L1.

The control circuit 3 is configured to make a transition from the charging mode to the normal mode when the startup time as clocked by the second clocking unit reaches a charging time t0 set in advance to the control circuit 3.

The burst signal generating unit 6a is configured to generate a first burst signal including an on-duty ratio of a dimming signal according to the determination result described earlier from the determining unit 5 when the startup time as clocked by the second clocking unit reaches the charging time t0 set in advance to the control circuit 3. In addition, the burst signal generating unit 6a is configured to output the generated first burst signal to the output unit 6c.

The switching signal generating unit 6b is configured to generate a first switching signal according to the first detected signal from the zero cross detection circuit 8 and the second detected signal from the current peak value detection circuit 9 when the startup time as clocked by the second clocking unit reaches the charging time t0 set in advance to the control circuit 3. In addition, the switching signal generating unit 6b is configured to output the generated first switching signal to the output unit 6c.

The output unit 6c is configured to compute a logical AND of the first burst signal from the burst signal generating unit 6a and the first switching signal from the switching signal generating unit 6b with the computing unit described above. In addition, the output unit 6c is configured to output the generated first drive signal to the gate drive circuit 7 according to the result of the computation.

In the present embodiment, while after setting the frequency of the first burst signal and the frequency of the second burst signal to a same frequency, the on-duty ratio of the second burst signal is set to an on-duty ratio that is larger than the on-duty ratio of the first burst signal corresponding to the dimming level that is the lower limit of dimming, these settings are not restrictive. For example, in the present embodiment, after setting the frequency of the first burst signal and the frequency of the second burst signal to different frequencies, the on-duty ratio of the second burst signal may be set to an on-duty ratio that is larger than the on-duty ratio of the first burst signal corresponding to the dimming level that is the lower limit of dimming. In addition, in the present embodiment, after setting the on-width of the first burst signal and the on-width of the second burst signal to a same on-width, the frequency of the second burst signal may be set to a frequency that is higher than the frequency of the first burst signal. Furthermore, in the present embodiment, after setting the frequency of the second burst signal to a frequency that is lower than the frequency of the first burst signal, the on-duty ratio of the second burst signal may be set to an on-duty ratio that is larger than the on-duty ratio of the first burst signal corresponding to the dimming level that is the lower limit of dimming.

Figure 3A:
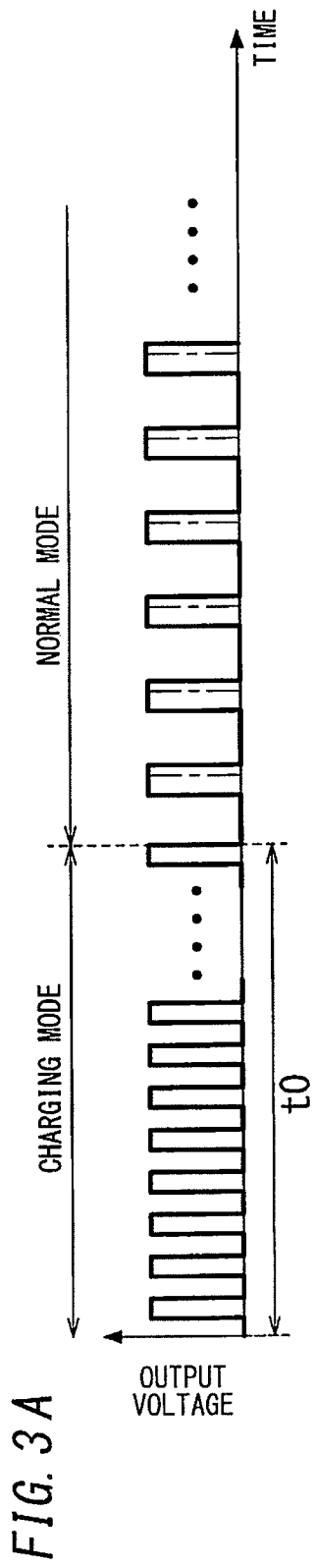
FIG. 3A is an explanatory diagram of a drive signal in the lighting apparatus according to the first embodiment.
Figure 3B:
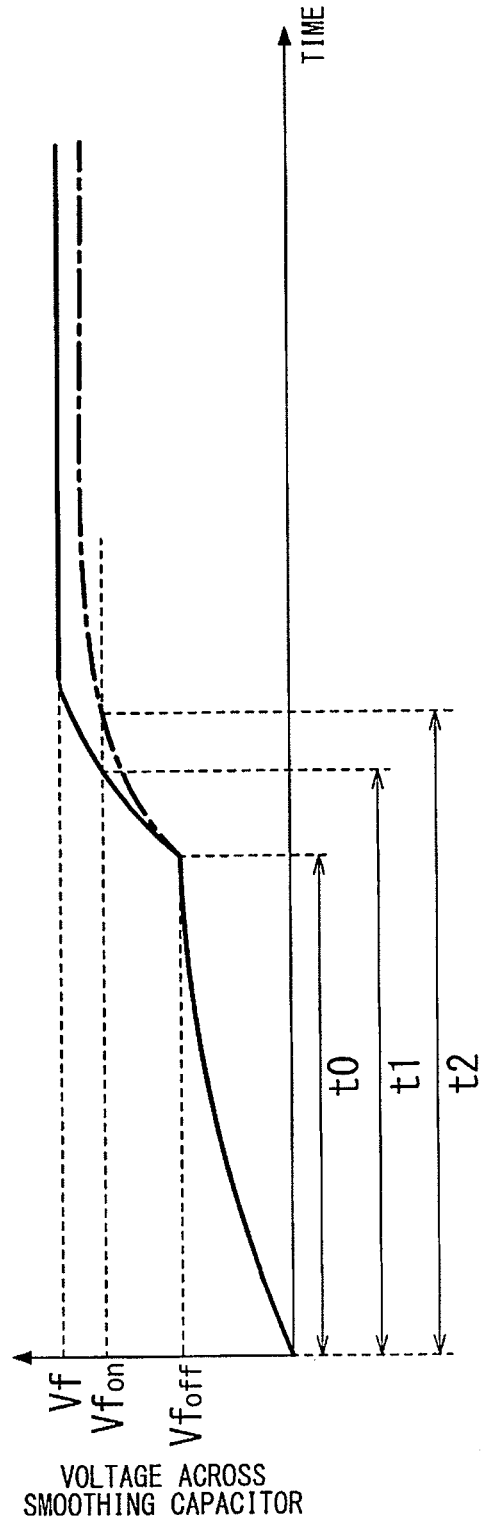
FIG. 3B is a correlation diagram between a voltage across a smoothing capacitor and a period of time from an unlighted state to lighting of a solid state light-emitting element in the lighting apparatus according to the first embodiment.

With the lighting apparatus 10 according to the present embodiment, the control circuit 3 is configured to make a transition from the charging mode to the normal mode immediately after charging the smoothing capacitor C1 in the charging mode, and to control the chopper circuit 2 to light each solid state light-emitting element 21 in the normal mode. Accordingly, with the lighting apparatus 10, when dimming each solid state light-emitting element 21 at a dimming level that is the lower limit of dimming of the solid state light-emitting element 21 from an unlighted state of the solid state light-emitting element 21, a period of time t2 (refer to FIG. 3B) from an unlighted state to dimming of each solid state light-emitting element 21 can be comparatively reduced. Moreover, t1 in FIG. 3B denotes a period of time from an unlighted state to full lighting of each solid state light-emitting element 21. In addition, a solid line in FIG. 3B depicts a change in the voltage $V_C$ across the smoothing capacitor C1 when each solid state light-emitting element 21 is fully lighted. Furthermore, a dash dotted line in FIG. 3B depicts a change in the voltage $V_C$ across the smoothing capacitor C1 when each solid state light-emitting element 21 is dimmed at a dimming level that is the lower limit of dimming. Moreover, a dash dotted line in FIG. 3A depicts a part of a drive signal when each solid state light-emitting element 21 is dimmed at a dimming level that is the lower limit of dimming. Hereinafter, in the present embodiment, for convenience of explanation, dimming each solid state light-emitting element 21 at a dimming level that is the lower limit of dimming of each solid state light-emitting element 21 may also be simply referred to as dimming. In addition, in the present embodiment, a state in which a certain prescribed current (for example, a rated current of the solid state light-emitting element 21) flows through each solid state light-emitting element 21 and the solid state light-emitting element 21 is lighted (in the present embodiment, this lighted state is assumed to be lighting at 100% of a dimming level that is an upper limit of dimming) will be referred to as full lighting of each solid state light-emitting element 21.

Furthermore, in FIG. 4C, the present inventors present a correlation diagram between the voltage $V_C$ across the smoothing capacitor C1 and the period of time from an unlighted state to lighting of each solid state light-emitting element 21 in the case of another lighting apparatus (hereinafter, referred to as a "first lighting apparatus") which charges the smoothing capacitor C1 only by an operation in the normal mode. Moreover, a solid line in FIG. 4C depicts a change in the voltage $V_C$ across the smoothing capacitor C1 when each solid state light-emitting element 21 is fully lighted. In addition, a dash dotted line in FIG. 4C depicts a change in the voltage $V_C$ across the smoothing capacitor C1 when each solid state light-emitting element 21 is dimmed. Furthermore, Vf in FIG. 4C denotes a rated forward voltage of the solid state light-emitting element 21. In addition, $Vf_{ON}$ in FIG. 4C denotes a voltage at which the solid state light-emitting element 21 is lighted. Furthermore, t1 in FIG. 4C denotes a period of time from an unlighted state to full lighting of each solid state light-emitting element 21. Moreover, t2 in FIG. 4C denotes a period of time from an unlighted state to dimming of each solid state light-emitting element 21.

With the first lighting apparatus described above, as shown in FIG. 4C, a difference in periods of time between the period of time t1 from an unlighted state to full lighting of each solid state light-emitting element 21 and the period of time t2 from an unlighted state to dimming of each solid state light-emitting element 21 increases.

By comparison, in the lighting apparatus 10 according to the present embodiment, a configuration is adopted in which a transition from the charging mode to the normal mode is made immediately after charging the smoothing capacitor C1 in the charging mode and the chopper circuit 2 is controlled to light each solid state light-emitting element 21 in the normal mode. Accordingly, with the lighting apparatus 10 according to the present embodiment, the difference in periods of time between the period of time t1 from an unlighted state to full lighting of each solid state light-emitting element 21 and the period of time t2 from an unlighted state to dimming of each solid state light-emitting element 21 can be reduced in comparison to the first lighting apparatus (refer to FIG. 3B).

In addition, with the lighting apparatus 10 according to the present embodiment, favorably, the period of time t0 that is required for the voltage $V_C$ across the smoothing capacitor C1 to equal the prescribed voltage $Vf_{off}$ from 0 V is longer than a period of time that is required for a dimming signal input to the determining unit 5 to stabilize. In this context, the present inventors have confirmed by measurement that, when a signal line type LED light controller manufactured by Panasonic which outputs dimming signals (for example, model number NQ20355) is used as the dimmer described earlier, the period of time that is required for a dimming signal input to the determining unit 5 to stabilize is favorably 0.5 seconds or less and more favorably 0.2 seconds or less.

With the lighting apparatus 10 according to the present embodiment, a flash (where the respective solid state light-emitting elements 21 are instantaneously fully lighted) can be prevented from occurring due to a delay of input of a dimming signal to the determining unit 5 when power is supplied to the lighting apparatus 10. In addition, with the lighting apparatus 10, when the control circuit 3 makes a transition from the charging mode to the normal mode, each solid state light-emitting element 21 can be prevented from being lighted at a brightness that differs from a prescribed brightness due to instability of a dimming signal input to the determining unit 5.

In this case, operations in the charging mode of the control circuit 3 can be realized by a program loaded to the microcomputer that is used as the control circuit 3. Therefore, with the lighting apparatus 10 according to the present embodiment, there is no need to add electronic parts or change constants of the electronic parts of the lighting apparatus 10.

In the lighting apparatus 10 according to the present embodiment, the smoothing capacitor C1 is charged for certain period of time. Accordingly, in the lighting apparatus 10, as shown in "B" of FIG. 5, the voltage $V_C$ across the smoothing capacitor C1 when the startup time as clocked by the second clocking unit reaches the charging time t0 may possibility become a different voltage due to a variation in the capacity of the smoothing capacitor C1. Therefore, in the lighting apparatus 10, when the respective solid state light-emitting elements 21 are lighted in the normal mode, a variation in lighted states of the respective solid state light-emitting elements 21 may possibly occur. $V_{C1}$ to $V_{C3}$ in "B" of FIG. 5 respectively denote voltages $V_C$ across the smoothing capacitors C1 when the startup time as clocked by the second clocking unit reaches the charging time t0. The differences among $V_{C1}$ to $V_{C3}$ are attributable to a variation in the capacities of the smoothing capacitors C1. In addition, t0 in "B" of FIG. 5 denotes a charging time of the smoothing capacitors C1. Furthermore, a dash double-dotted line, a solid line, and a dash dotted line respectively depict changes in the voltage across the smoothing capacitors C1. In addition, "A" of FIG. 5 shows a drive signal from the output unit 6c. Furthermore, Ts in "A" of FIG. 5 denotes a switching cycle of the switching element Q1. In addition, Ton in "A" of FIG. 5 denotes an on-period in the switching cycle Ts.

In addition, with the smoothing capacitor C1, generally, the capacity of the smoothing capacitor C1 decreases due to deterioration over time. Accordingly, voltage that is applied to the smoothing capacitor C1 may possibly increase with the deterioration of the smoothing capacitor C1 over time. Therefore, in the lighting apparatus 10, the voltage $V_C$ across the smoothing capacitor C1 may possibly equal a total voltage of forward voltages of the respective solid state light-emitting elements 21 and the respective solid state light-emitting elements 21 may possibly become lighted during the charging mode.

Furthermore, the voltage charged to the smoothing capacitor C1 is favorably set to or below the prescribed voltage $Vf_{off}$ in order to suppress overcharging of the smoothing capacitor C1 that occurs due to a circuit constant of the chopper circuit 2.

In consideration thereof, the present inventors have contemplated another lighting apparatus (hereinafter, referred to as a "second lighting apparatus") in which the prescribed voltage $Vf_{off}$ is set to a voltage that is lower than a voltage expressed as [voltage equivalent to 60% of rated forward voltage of solid state light-emitting element 21]×[the number of solid state light-emitting elements 21].

With the second lighting apparatus, when each solid state light-emitting element 21 is to be dimmed at a dimming level that is a lower limit of dimming of the solid state light-emitting element 21 from an unlighted state of the solid state light-emitting element 21, a period of time required by the voltage $V_C$ across the smoothing capacitor C1 to equal a total voltage of forward voltages of the respective solid state light-emitting elements 21 may comparatively increase in comparison to the lighting apparatus 10. In other words, with the second lighting apparatus, when each solid state light-emitting element 21 is to be dimmed at a dimming level that is a lower limit of dimming of the solid state light-emitting element 21 from an unlighted state of the solid state light-emitting element 21, a period of time from an unlighted state to dimming of each solid state light-emitting element 21 may comparatively increase in comparison to the lighting apparatus 10.

In comparison, with the lighting apparatus 10 according to the present embodiment, the control of the chopper circuit 2 by the control circuit 3 may be stopped when the voltage $V_C$ across the smoothing capacitor C1 reaches the prescribed voltage $Vf_{off}$ in the charging mode. In other words, with the lighting apparatus 10, charging of the smoothing capacitor C1 may be stopped when the voltage $V_C$ across the smoothing capacitor C1 reaches the prescribed voltage $Vf_{off}$ in the charging mode.

The control circuit 3 is configured to clock a period of time (hereinafter, referred to as an "increase time") Tu (refer to FIG. 6) in which the current $I_{L1}$ that flows through the inductor L1 increases over time. In addition, the control circuit 3 is configured to clock a period of time (hereinafter, referred to as a "decrease time") Td (refer to FIG. 6) in which the current $I_{L1}$ that flows through the inductor L1 decreases over time. Moreover, $I_{L1}$ (T) in FIG. 6 denotes a current value of the current $I_{L1}$ that flows through the inductor L1 at time T. In addition, $I_P$ in FIG. 6 represents a current peak value of the current $I_{L1}$ that flows through the inductor L1. Furthermore, Ts in FIG. 6 denotes a switching cycle of the switching element Q1.

In addition, the control circuit 3 is configured to detect a current peak value $I_P$ of the current $I_{L1}$ that flows through the inductor L1 with the current peak value detection circuit 9. Furthermore, the control circuit 3 is configured to detect a zero crossing point of the current $I_{L1}$ that flows through the inductor L1 with the zero cross detection circuit 8.

Furthermore, the control circuit 3 is configured to clock a period of time (the increase time Tu) that is required by the current $I_{L1}$ that flows through the inductor L1 to equal the current peak value $I_P$ from the zero crossing point with a third clocking unit (not shown) provided in advance. Furthermore, the control circuit 3 is configured to clock a period of time (the decrease time Td) that is required by the current $I_{L1}$ that flows through the inductor L1 to reach the zero crossing point from the current peak value $I_P$ with the third clocking unit. Therefore, the control circuit 3 is capable of clocking the increase time Tu in which the current $I_{L1}$ that flows through the inductor L1 increases over time and the decrease time Td in which the current $I_{L1}$ that flows through the inductor L1 decreases over time. Moreover, as the third clocking unit, for example, a counter (not shown) built into the microcomputer that is used as the control circuit 3 may be adopted. In addition, in the present embodiment, the third clocking unit constitutes a clocking unit which clocks a period of time in which the current $I_{L1}$ that flows through the inductor L1 increases and a period of time in which the current $I_{L1}$ that flows through the inductor L1 decreases.

If Tu denotes an increase time in which the current $I_{L1}$ that flows through the inductor L1 increases over time, Td denotes a decrease time in which the current $I_{L1}$ that flows through the inductor L1 decreases over time, and $V_{DC}$ denotes an input voltage of the chopper circuit 2, then the voltage $V_C$ across the smoothing capacitor C1 can be obtained by the following equation.

[Math 3]

$$V_C = \frac{Tu}{Tu + Td} \times V_{DC} \qquad \text{Equation (3)}$$

In this case, a voltage value of the input voltage $V_{DC}$ of the chopper circuit 2 in equation (3) presented above is stored in, for example, a memory (not shown) built into the microcomputer that is used as the control circuit 3. In addition, in the present embodiment, the memory and the counter built into the microcomputer that is used as the control circuit 3, the zero cross detection circuit 8, and the current peak value detection circuit 9 constitute a detecting unit that detects the voltage $V_C$ across the smoothing capacitor C1.

The control circuit 3 is configured to performed the computation of equation (3) presented above for each switching cycle Ts of the switching element Q1. In addition, the control circuit 3 is configured to compare $V_C$ obtained by computation with the prescribed voltage $Vf_{off}$. Accordingly, the control circuit 3 is capable of determining that the voltage $V_C$ across the smoothing capacitor C1 has reached the prescribed voltage $Vf_{off}$. Moreover, in the present embodiment, as a unit configured to determine that the voltage $V_C$ across the smoothing capacitor C1 has reached the prescribed voltage $Vf_{off}$, for example, a comparator (not shown) built into the microcomputer that is used as the control circuit 3 may be adopted.

In addition, the control circuit 3 is configured to stop controlling the chopper circuit 2 when the voltage $V_C$ across the smoothing capacitor C1 reaches the prescribed voltage $Vf_{off}$. Specifically, the output unit 6c is configured to stop outputting the second drive signal to the gate drive circuit 7 when the voltage $V_C$ across the smoothing capacitor C1 reaches the prescribed voltage $Vf_{off}$ (time points T3 and T4 in "C" of FIG. 7). Accordingly, in the lighting apparatus 10 according to the present embodiment, the voltage $V_C$ across the smoothing capacitor C1 can be prevented from becoming a different voltage due to a variation in the capacity of the smoothing capacitor C1 when the startup time as clocked by the second clocking unit reaches the charging time to. In this case, a dash dotted line and a solid line in "C" of FIG. 7 respectively depict changes in the voltage across the smoothing capacitor C1. In addition, Vf in "C" of FIG. 7 denotes a rated forward voltage of the solid state light-emitting element 21. Furthermore, $Vf_{ON}$ in "C" of FIG. 7 denotes a voltage at which the solid state light-emitting element 21 is lighted. Moreover, $Vf_{off}$ in "C" of FIG. 7 denotes a prescribed voltage at which the solid state light-emitting element 21 is not lighted. In addition, t0 in "C" of FIG. 7 denotes a charging time of the smoothing capacitor C1. Furthermore, "A" and "B" of FIG. 7 respectively show the second drive signal from the output unit 6c.

Furthermore, the control circuit 3 is configured to control the chopper circuit 2 when the control circuit 3 makes a transition from the charging mode to the normal mode (T5 and onward in "C" of FIG. 7). Specifically, when the control circuit 3 makes a transition from the charging mode to the normal mode, the control circuit 3 is configured to control the chopper circuit 2 so that the output unit 6c outputs a first drive signal to the gate drive circuit 7.

Therefore, with the lighting apparatus 10 according to the present embodiment, when lighting the respective solid state light-emitting elements 21 in the normal mode, a variation in the lighted states of the respective solid state light-emitting elements 21 due to a variation in the capacity of the smoothing capacitor C1 can be suppressed.

In addition, an operation for detecting the voltage $V_C$ across the smoothing capacitor C1 with the control circuit 3 can be realized by a program loaded to the microcomputer that is used as the control circuit 3. Therefore, with the lighting apparatus 10, a detecting circuit for detecting the voltage $V_C$ across the smoothing capacitor C1 is not necessary.

In the lighting apparatus 10 according to the present embodiment, while a voltage value stored in advance in the memory in the microcomputer that is used as the control circuit 3 is adopted as the voltage value of the input voltage $V_{DC}$ of the chopper circuit 2 that is used in the computation of equation (3) presented above, the use of the stored voltage value is not restrictive. For example, in the present embodiment, a detecting circuit for detecting the input voltage $V_{DC}$ of the chopper circuit 2 may be provided and a voltage value of the input voltage $V_{DC}$ of the chopper circuit 2 as detected by the detecting circuit may be used.

In addition, while the control circuit 3 stops charging the smoothing capacitor C1 when the voltage $V_C$ across the smoothing capacitor C1 reaches the prescribed voltage $Vf_{off}$, the control circuit 3 may control the chopper circuit 2 to charge the smoothing capacitor C1 so that the respective solid state light-emitting elements 21 are not lighted. Specifically, the control circuit 3 may control the chopper circuit 2 so that the voltage $V_C$ across the smoothing capacitor C1 does not reach a voltage $Vf_{ON}$ at which the solid state light-emitting elements 21 are lighted. For example, the control circuit 3 may control the chopper circuit 2 by an operation in which a duty ratio of a dimming signal is 0% to 5%. Accordingly, with the lighting apparatus 10 according to the present embodiment, the voltage $V_C$ across the smoothing capacitor C1 can be prevented from declining after the voltage $V_C$ across the smoothing capacitor C1 reaches the prescribed voltage $Vf_{off}$.

The lighting apparatus 10 according to the present embodiment described above is the lighting apparatus 10 that includes the chopper circuit 2 including the switching element Q1, the inductor L1, the diode D1, and the smoothing capacitor C1, and the control circuit 3 that controls the chopper circuit 2. The control circuit 3 includes: a determining unit 5 configured to determine a duty ratio of a dimming signal that instructs a dimming level of each solid state light-emitting element 21 provided in a subsequent stage of the chopper circuit 2; and an output control unit 6 configured to output a drive signal for driving the switching element Q1. The control circuit 3 has a normal mode and a charging mode as operating modes. The control circuit 3 is configured to output a drive signal (a first drive signal) from the output control unit 6 according to a result of the determination by the determining unit 5 and to control the chopper circuit 2 to light the respective solid state light-emitting elements 21 in the normal mode. In the charging mode, the control circuit 3 is configured to set an average value of the current $I_{L1}$ that flows through the inductor L1 to be higher than an average value of the current $I_{L1}$ that flows through the inductor L1 when dimming each solid state light-emitting element 21 at a dimming level that is a lower limit of dimming in the normal mode, and to control the chopper circuit 2 to charge the smoothing capacitor C1 until the voltage $V_C$ across the smoothing capacitor C1 reaches a prescribed voltage $Vf_{off}$ that does not light each solid state light-emitting element 21. Therefore, with the lighting apparatus 10 according to the present embodiment, since the control circuit 3 controls the chopper circuit 2 to charge the smoothing capacitor C1 in the charging mode when power is supplied to the lighting apparatus 10, the smoothing capacitor C1 can be charged comparatively quickly in comparison to the normal mode.

In addition, in the lighting apparatus 10 according to the present embodiment, the control circuit 3 is configured to make a transition from the charging mode to the normal mode immediately after charging the smoothing capacitor C1 in the charging mode when power is supplied to the lighting apparatus 10 and to control the chopper circuit 2 to light each solid state light-emitting element 21 in the normal mode. Accordingly, with the lighting apparatus 10 according to the present embodiment, when dimming each solid state light-emitting element 21 at a dimming level that is the lower limit of dimming of the solid state light-emitting element 21 from an unlighted state of the solid state light-emitting element 21, a period of time t2 (refer to FIG. 3B) from an unlighted state to dimming of each solid state light-emitting element 21 can be comparatively reduced.

Hereinafter, an example of a lighting fixture 30 that includes the lighting apparatus 10 according to the present embodiment will be briefly described with reference to FIG. 8.

The lighting fixture 30 according to the present embodiment is to be arranged by being embedded in, for example, a ceiling material 40.

The lighting fixture 30 includes a plurality of solid state light-emitting elements 21, a lighting apparatus 10 that lights the plurality of solid state light-emitting elements 21, and a housing 11 that houses the lighting apparatus 10.

The housing 11 is formed in a box shape (in the present embodiment, a rectangular box shape). As a material of the housing 11, for example, a metal (such as iron, aluminum, and stainless steel) can be adopted. In the present embodiment, the housing 11 is arranged on one surface side (in FIG. 8, an upper surface side) of the ceiling material 40. In addition, in the present embodiment, a spacer 13 is arranged between the housing 11 and the ceiling material 40. The spacer 13 is configured to keep the housing 11 and the ceiling material 40 at a prescribed distance from one another. Accordingly, with the lighting fixture 30 according to the present embodiment, heat generated by the lighting apparatus 10 can be prevented from being transmitted to the ceiling material 40.

A first lead-out hole (not shown) is formed on one side wall (in FIG. 8, a left side wall) of the housing 11. The first lead-out hole is formed in order to lead out a first connection wire 12 that is electrically connected to the lighting apparatus 10. In this case, the lighting apparatus 10 is connected to an output connector 4a via the first connection wire 12.

In addition, the lighting fixture 30 includes a mounting substrate 22 on which the plurality of solid state light-emitting elements 21 are mounted and a fixture main body 23 to which the mounting substrate 22 is attached.

As the mounting substrate 22, for example, a metal-based printed wiring board can be adopted. In the present embodiment, an outer periphery of the mounting substrate 22 is given, for example, a circular shape. In addition, in the present embodiment, a planar size of the mounting substrate 22 is set slightly smaller than an opening size of the fixture main body 23.

The mounting substrate 22 is connected to an input connector 4b via a second connection wire 25. In the lighting fixture 30, the input connector 4b is detachably connectable to the output connector 4a. In the lighting fixture 30, by connecting the output connector 4a and the input connector 4b, the lighting apparatus 10 and the mounting substrate 22 are electrically connected to each other. Moreover, in the lighting fixture 30, the output connector 4a and the input connector 4b constitute a connector 4.

The plurality of solid state light-emitting elements 21 are mounted on one surface side (in FIG. 8, a lower surface side) of the mounting substrate 22. Note that three solid state light-emitting elements 21 out of four solid state light-emitting elements 21 are shown in FIG. 8.

The fixture main body 23 is formed in a bottomed tubular shape (in the present embodiment, a bottomed cylindrical shape). As a material of the fixture main body 23, for example, a metal (such as iron, aluminum, and stainless steel) can be adopted.

A second lead-out hole (not shown) is formed on a bottom wall 23a of the fixture main body 23. The second lead-out hole is formed in order to lead out a second connection wire 25 that is electrically connected to the mounting substrate 22.

In the lighting fixture 30 according to the present embodiment, the mounting substrate 22 is arranged on an inner side of the bottom wall 23a of the fixture main body 23. In addition, in the lighting fixture, the mounting substrate 22 is attached to the bottom wall 23a of the fixture main body 23. Furthermore, in the lighting fixture 30, for example, an adhesive sheet (not shown) with electrical insulating and heat conducting properties is used as a member to attach the mounting substrate 22 to the bottom wall 23a of the fixture main body 23.

A flange part 23c that extends outward is provided at a lower end part of a side wall 23b of the fixture main body 23. In addition, a pair of mounting fittings (not shown) is provided at the lower end part of the side wall 23b of the fixture main body 23. The pair of mounting fittings is configured to sandwich, together with the flange part 23c, a peripheral part of an embedded hole 40a that is formed in advance in the ceiling material 40.

With the lighting fixture 30 according to the present embodiment, by sandwiching the peripheral part of the embedded hole 40a of the ceiling material 40 with the pair of mounting fittings and the flange part 23c, the fixture main body 23 can be arranged by being embedded in the ceiling material 40.

In addition, the lighting fixture 30 includes a light diffusion plate 24 that diffuses light radiated from each solid state light-emitting element 21. The light diffusion plate 24 is formed so as to cover an opening part of the fixture main body 23.

As a material of the light diffusion plate 24, a translucent material (for example, acrylic resin and glass) can be adopted. In the present embodiment, the light diffusion plate 24 is given, for example, a disk like shape. In addition, in the present embodiment, the light diffusion plate 24 is detachably attached to the lower end part of the side wall 23b of the fixture main body 23.

The lighting fixture 30 according to the present embodiment described above includes: the solid state light-emitting elements 21; and the lighting apparatus 10 configured to light the solid state light-emitting elements 21. Accordingly, with the lighting fixture 30 according to the present embodiment, when dimming each solid state light-emitting element 21 at a dimming level that is the lower limit of dimming of the solid state light-emitting element 21 from an unlighted state of the solid state light-emitting element 21, a period of time t2 from an unlighted state to dimming of each solid state light-emitting element 21 can be comparatively reduced.

In addition, in the lighting fixture 30 according to the present embodiment, the housing 11 that houses the lighting apparatus 10 is provided as a separate body from the fixture main body 23 to which the mounting substrate 22 mounted with the plurality of solid state light-emitting elements 21 is attached. Accordingly, with the lighting fixture 30, thickness of the fixture main body 23 can be reduced.

(Second Embodiment)

Figure 9:
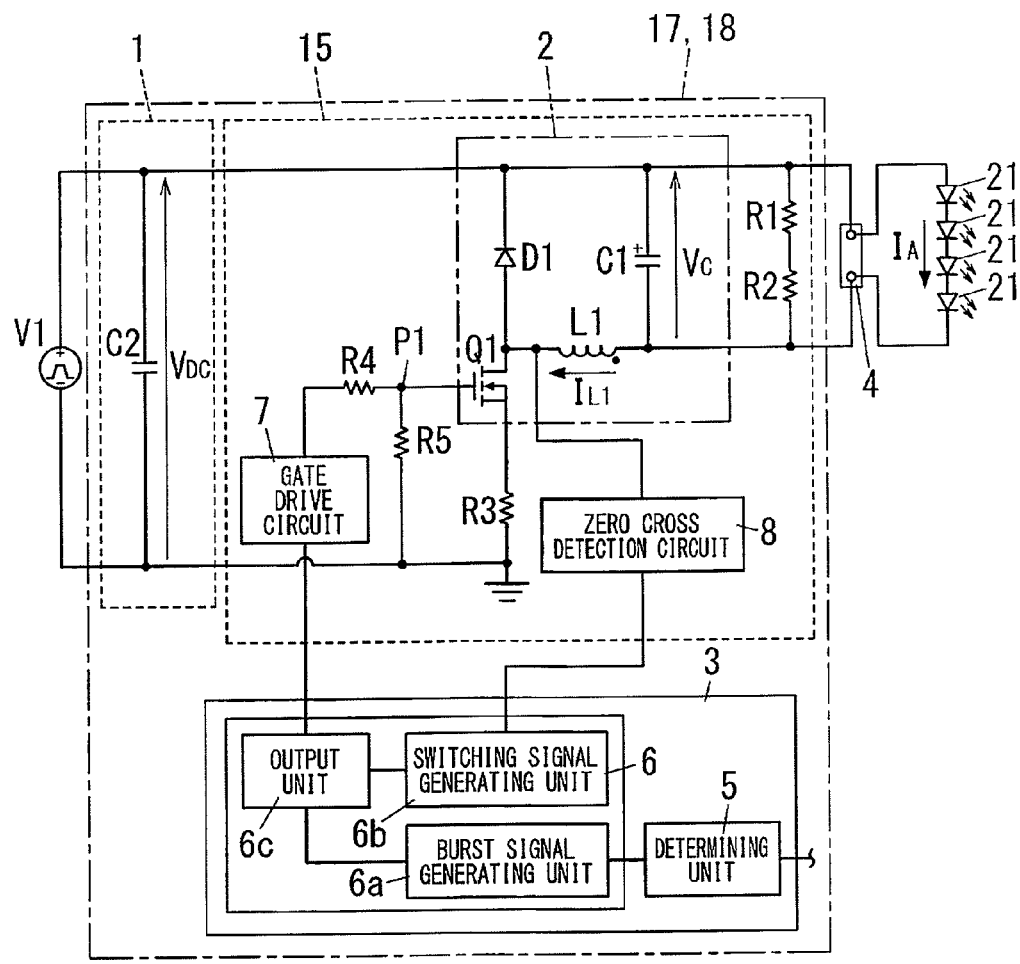
FIG. 9 is a schematic configuration diagram of a lighting apparatus according to second and third embodiments.

A lighting apparatus 17 according to the present embodiment has a same basic configuration as the first embodiment. However, as shown in FIG. 9, the lighting apparatus 17 according to the present embodiment differs from the first embodiment in that the current peak value detection circuit 9 and the like are not provided. It should be noted that components similar to those of the first embodiment will be denoted by the same reference numerals and descriptions thereof will be omitted as appropriate.

The output control unit 6 includes a switching signal generating unit 6d that generates a third switching signal in place of the switching signal generating unit 6b according to the first embodiment. The third switching signal is a signal for preventing the current $I_{L1}$ that flows through the inductor L1 from exceeding the current peak value $I_P$ (refer to "C" of FIG.

10). Moreover, in the present embodiment, for example, a PWM signal is used as the third switching signal.

With the lighting apparatus 17, an on-width $t_{ON}$ of the third switching signal is obtained by equation (2) presented earlier so that the current $I_{L1}$ that flows through the inductor L1 does not exceed the current peak value $I_P$.

The switching signal generating unit 6d is configured to output the third switching signal to the output unit 6c according to a first detected signal from the zero cross detection circuit 8.

Hereinafter, operations of the control circuit 3 in the lighting apparatus 17 according to the present embodiment will be briefly described. Moreover, the present embodiment will be described on the assumption that the switching element Q1 has changed from an on-state to an off-state. In addition, in the present embodiment, descriptions of operations similar to those of the first embodiment will be omitted as appropriate.

When the zero cross detection circuit 8 detects a zero crossing point of the current $I_{L1}$ that flows through the inductor L1, the zero cross detection circuit 8 outputs a first detected signal to the switching signal generating unit 6d.

When the first detected signal is input to the switching signal generating unit 6d from the zero cross detection circuit 8, the switching signal generating unit 6d outputs a third switching signal to the output unit 6c.

The output unit 6c computes a logical AND of the first burst signal from the burst signal generating unit 6a and the third switching signal from the switching signal generating unit 6d with the computing unit described earlier. In addition, the output unit 6c outputs a drive signal (hereinafter, referred to as a "third drive signal") to the gate drive circuit 7 according to the results of the computation. Moreover, in the present embodiment, for example, a PWM signal is used as the third drive signal.

The gate drive circuit 7 drives (turns on/off) the switching element Q1 according to the third drive signal from the output unit 6c. In other words, the gate drive circuit 7 causes the switching element Q1 to enter an on-state for a certain period of time according to the third drive signal from the output unit 6c, and after the certain period of time lapses, changes the switching element Q1 to an off-state. Accordingly, with the lighting apparatus 17 according to the present embodiment, the current $I_{L1}$ that flows through the inductor L1 can be prevented from exceeding the current peak value $I_P$ without using the current peak value detection circuit 9 according to the first embodiment. Therefore, since the lighting apparatus 17 can be configured without the current peak value detection circuit 9 according to the first embodiment, downsizing from the lighting apparatus 10 according to the first embodiment can be achieved.

The lighting apparatus 17 according to the present embodiment may be applied to, for example, the lighting fixture 30 according to the first embodiment.

(Third Embodiment)

A lighting apparatus 18 according to the present embodiment has a same basic configuration as the second embodiment as shown in FIG. 9. However, the lighting apparatus 18 according to the present embodiment differs from the second embodiment in that the control circuit 3 controls the chopper circuit 2 to charge the smoothing capacitor C1 so that the current $I_{L1}$ flowing through the inductor L1 does not exceed a rated current value $I_S$ of the inductor L1 and the like. It should be noted that components similar to those of the second embodiment will be denoted by the same reference numerals and descriptions thereof will be omitted as appropriate.

With the lighting apparatus 17 according to the second embodiment, when power is supplied to the lighting apparatus 17, there is a possibility that a charge is not sufficiently accumulated in the smoothing capacitor C1. The present inventors considered another lighting apparatus (hereinafter, referred to as a "third lighting apparatus") that charges the smoothing capacitor C1 only by an operation in the normal mode. In addition, the present inventors considered the possibility that the current $I_{L1}$ flowing through the inductor L1 does not exceed a rated current value $I_S$ (refer to "C" of FIG. 10) of the inductor L1 when power is supplied to the third lighting apparatus because the switching element Q1 is turned on/off according to the third drive signal. Furthermore, the present inventors considered the possibility in the third lighting apparatus that an overcurrent may flow through the inductor L1 when the current $I_{L1}$ flowing through the inductor L1 exceeds the rated current value $I_S$ of the inductor L1 and, as a result, the inductor L1 may become saturated.

In the lighting apparatus 18 according to the present embodiment, the burst signal generating unit 6a is configured to generate a burst signal (hereinafter, referred to as a "third burst signal") and to output the third burst signal to the output unit 6c. The third burst signal is a signal for preventing the current $I_{L1}$ that flows through the inductor L1 from exceeding the rated current value $I_S$ of the inductor L1. Moreover, in the present embodiment, for example, a PWM signal is used as the third burst signal.

The present inventors considered another lighting apparatus (hereinafter, referred to as a "fourth lighting apparatus") that charges the smoothing capacitor C1 in the charging mode. In addition, the present inventors considered setting an on-duty ratio of the third burst signal to a smaller on-duty ratio (refer to FIG. 11A) than the on-duty ratio (refer to "A" of FIG. 10) of the first burst signal in the fourth lighting apparatus. Moreover, f1 in "A" and "B" of FIG. 10 denotes frequencies of the first burst signal and the third burst signal and indicates that the frequencies are the same. In addition, in the present embodiment, the frequency f1 of the first burst signal and the third burst signal is set to, for example, 1 [ms]. Furthermore, $I_S$ in FIG. 11C denotes a rated current value of the inductor L1.

With the fourth lighting apparatus, since the current $I_{L1}$ flowing through the inductor L1 does not exceed the rated current value $I_S$ of the inductor L1, an overcurrent can be prevented from flowing through the inductor L1 and, as a result, saturation of the inductor L1 can be prevented.

However, since the fourth lighting apparatus has a longer period of time (refer to FIG. 11B) in which the switching element Q1 enters an off-state as compared to the third lighting apparatus, an average value of the current $I_{L1}$ flowing through the inductor L1 decreases (refer to FIG. 11C). Therefore, with the fourth lighting apparatus, the charging time t0 required to charge the smoothing capacitor C1 may possibly increase in comparison to the third lighting apparatus.

Figure 10:
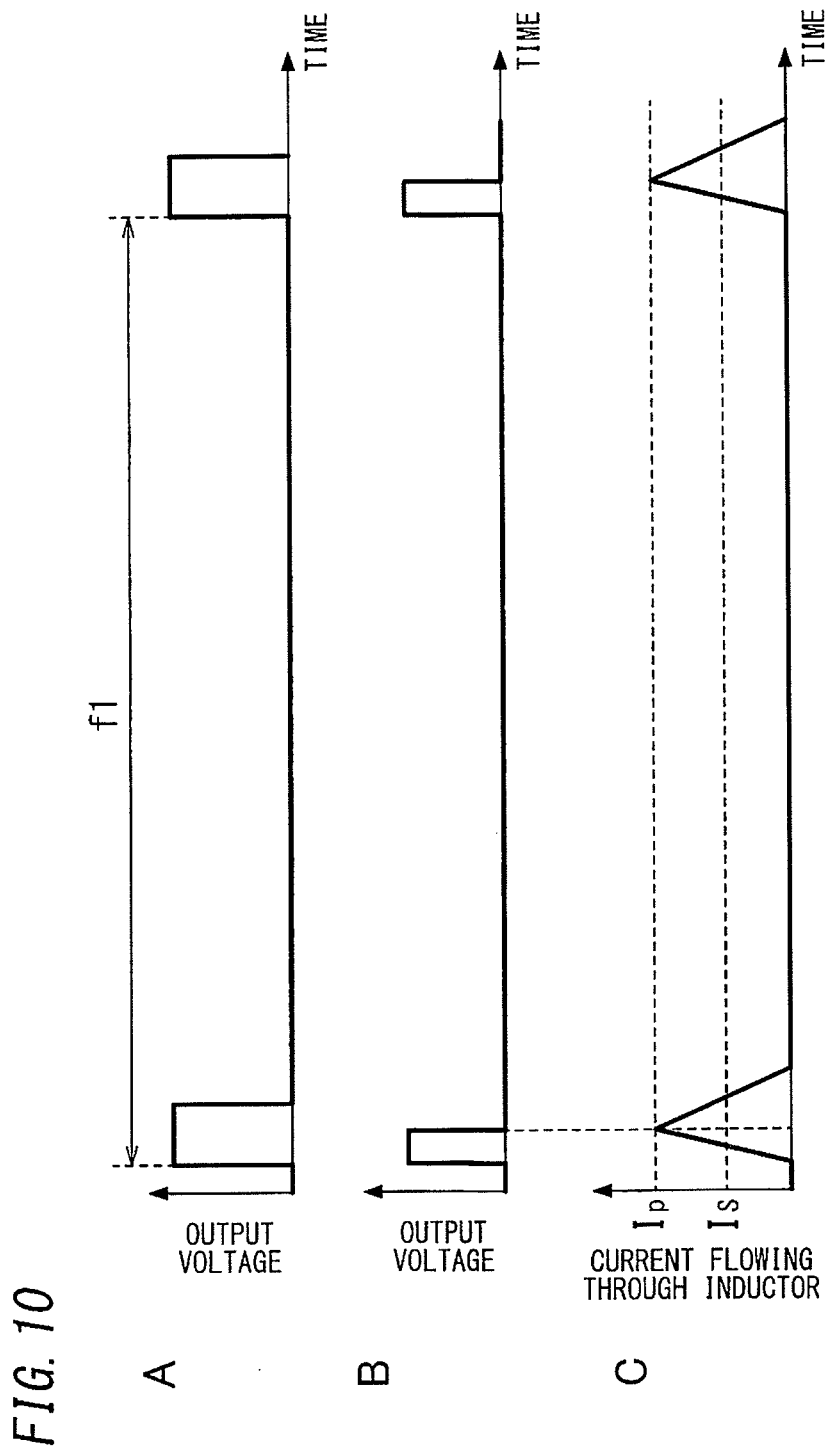
FIG. 10 relates to another lighting apparatus according to the second embodiment, in which "A" of FIG. 10 is an explanatory diagram of a first burst signal, "B" of FIG. 10 is an explanatory diagram of a third drive signal, and "C" of FIG. 10 is an explanatory diagram of a current flowing through an inductor.
Figure 12A:
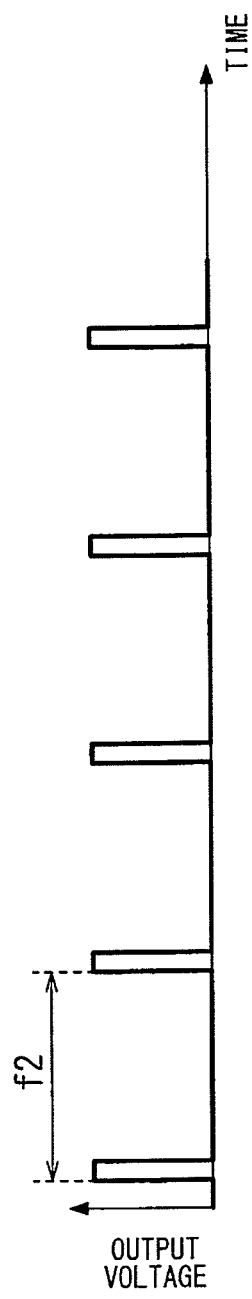
FIG. 12A is an explanatory diagram of a third burst signal in the lighting apparatus according to the third embodiment.
Figure 12B:
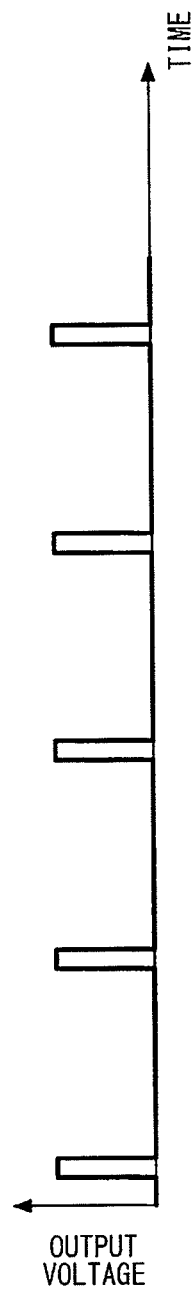
FIG. 12B is an explanatory diagram of a fourth drive signal in the lighting apparatus according to the third embodiment.
Figure 12C:
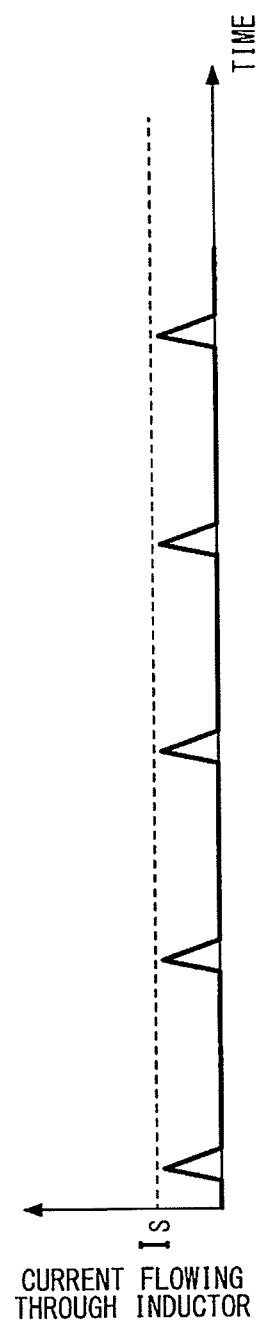
FIG. 12C is an explanatory diagram of a current flowing through an inductor in the lighting apparatus according to the third embodiment.

In the lighting apparatus 18 according to the present embodiment, the present inventors considered setting the on-duty ratio of the third burst signal to a smaller on-duty ratio (refer to FIG. 12A) than the on-duty ratio of the first burst signal ("A" of FIG. 10) and, at the same time, setting a frequency of the third burst signal to a higher frequency (refer to FIG. 12A) than the frequency of the first burst signal ("A" of FIG. 10). Moreover, f2 in FIG. 12A denotes the frequency of the third burst signal. In addition, in the present embodiment, the frequency f2 of the third burst signal is set to, for example, 0.2 [ms]. Furthermore, $I_S$ in FIG. 12C denotes a rated current value of the inductor L1.

With the lighting apparatus 18 according to the present embodiment, a period of time (refer to FIG. 12B) in which the switching element Q1 enters an off-state is shorter and an average value of the current $I_{L1}$ flowing through the inductor L1 increases (refer to FIG. 12C) as compared to the fourth lighting apparatus. Therefore, with the lighting apparatus 18 according to the present embodiment, the charging time t0 required to charge the smoothing capacitor C1 can be reduced in comparison to the fourth lighting apparatus.

In the lighting apparatus 18 according to the present embodiment, the burst signal generating unit 6a is configured to generate a third burst signal which includes an on-duty ratio that is smaller than the on-duty ratio of the first burst signal and which includes a frequency that is higher than the frequency of the first burst signal when the control circuit 3 is in the charging mode. In addition, in the lighting apparatus 18, the burst signal generating unit 6a is configured to output the third burst signal to the output unit 6c when the control circuit 3 is in the charging mode.

The output unit 6c is configured to compute a logical AND of the third burst signal from the burst signal generating unit 6a and the third switching signal from the switching signal generating unit 6d with the computing unit described above. In addition, the output unit 6c is configured to output a drive signal (hereinafter, referred to as a "fourth drive signal") to the gate drive circuit 7 according to the results of the computation. Moreover, in the present embodiment, for example, a PWM signal is used as the fourth drive signal.

In the lighting apparatus 18 according to the present embodiment described above, when power is supplied to the lighting apparatus 18 and the control circuit 3 is in the charging mode, the burst signal generating unit 6a generates a third burst signal which includes an on-duty ratio that is smaller than the on-duty ratio of the first burst signal and which includes a frequency that is higher than the frequency of the first burst signal and outputs the third burst signal to the output unit 6c. Accordingly, with the lighting apparatus 18 according to the present embodiment, since the current $I_{L1}$ flowing through the inductor L1 does not exceed the rated current value $I_S$ of the inductor L1, an overcurrent can be prevented from flowing through the inductor L1 and, as a result, saturation of the inductor L1 can be prevented. Therefore, with the lighting apparatus 18, since the inductor L1 can be prevented from becoming saturated, excessive stress that is applied to the switching element Q1 and the diode D1 can be suppressed.

In addition, in the lighting apparatus 18 according to the present embodiment, since the burst signal generating unit 6a generates the third burst signal described above and outputs the third burst signal to the output unit 6c when the control circuit 3 is in the charging mode, an average value of the current $I_{L1}$ that flows through the inductor L1 can be increased and, consequently, the smoothing capacitor C1 can be charged comparatively quicker in comparison to the fourth lighting apparatus.

Furthermore, with the lighting apparatus 18 according to the present embodiment, when power is supplied to the lighting apparatus 18, the control circuit 3 makes a transition from the charging mode to the normal mode immediately after charging the smoothing capacitor C1 in the charging mode and controls the chopper circuit 2 to light each solid state light-emitting element 21 in the normal mode. Accordingly, with the lighting apparatus 18 according to the present embodiment, when dimming each solid state light-emitting element 21 at a dimming level that is the lower limit of dimming of the solid state light-emitting element 21 from an unlighted state of the solid state light-emitting element 21, a period of time t2 from an unlighted state to dimming of each solid state light-emitting element 21 can be comparatively reduced.

In addition, since the lighting apparatus 18 according to the present embodiment can be configured without the current peak value detection circuit 9 according to the first embodiment, downsizing from the lighting apparatus 10 according to the first embodiment can be achieved.

The lighting apparatus 18 according to the present embodiment may be applied to, for example, the lighting fixture 30 according to the first embodiment.

(Fourth Embodiment)

Figure 13:
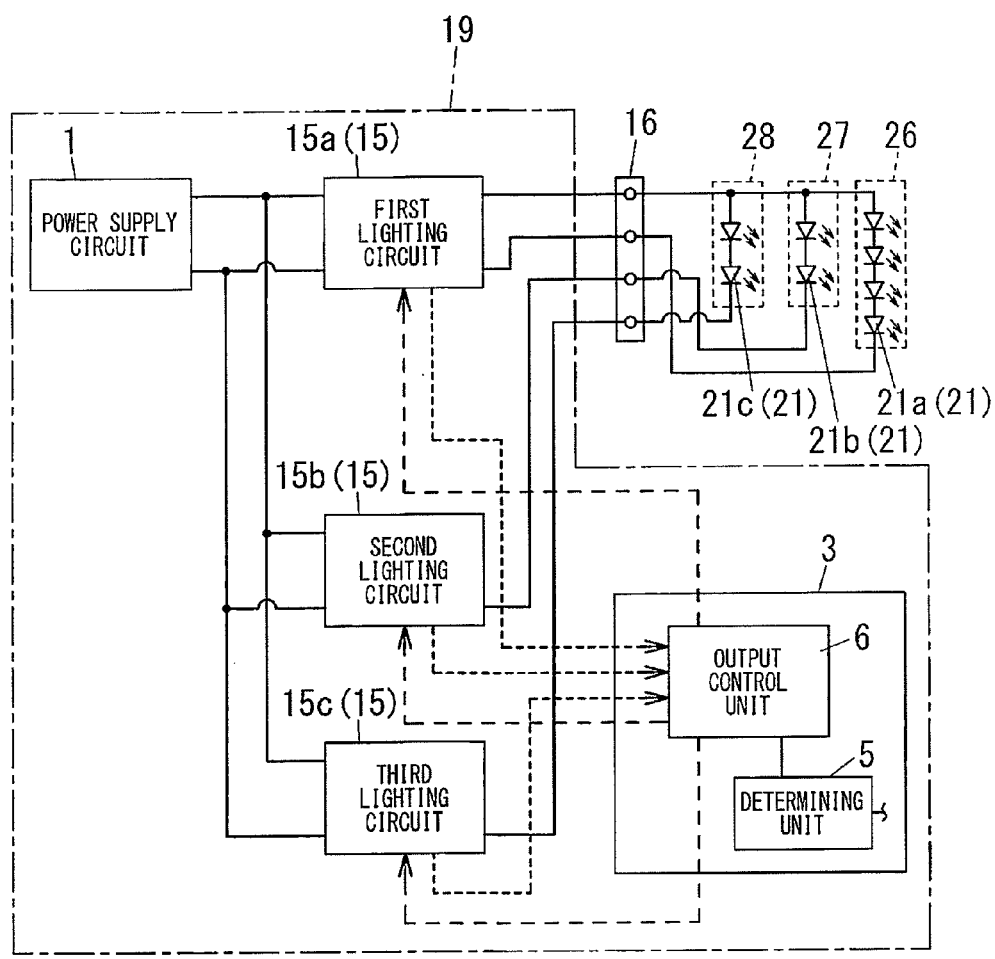
FIG. 13 is a schematic configuration diagram of a lighting apparatus according to a fourth embodiment.

A lighting apparatus 19 according to the present embodiment has a same basic configuration as the first embodiment. However, as shown in FIG. 13, the lighting apparatus 19 according to the present embodiment differs from the first embodiment in that a plurality of lighting circuits 15 and the like are provided. It should be noted that components similar to those of the first embodiment will be denoted by the same reference numerals and descriptions thereof will be omitted as appropriate.

The lighting apparatus 19 includes, as the plurality of solid state light-emitting elements 21, for example, an LED that radiates red light (hereinafter, referred to as a "red LED") 21a, an LED that radiates green light (hereinafter, referred to as a "green LED") 21b, and an LED that radiates white light (hereinafter, referred to as a "white LED") 21c. In addition, in the lighting apparatus 19, the number of red LEDs 21a is set to 2×n (where n≥2). Furthermore, in the lighting apparatus 19, the respective numbers of green LEDs 21b and white LEDs 21c are set to n (where n≥2). Moreover, in the lighting apparatus 19, as an example, the number of the red LEDs 21a is set to four, the number of the green LEDs 21b is set to two, and the number of the white LEDs 21c is set to two.

The lighting apparatus 19 includes a plurality of (in the present embodiment, three) lighting circuits 15 that individually light a light source unit 26 to which the four red LEDs 21a are connected in series, a light source unit 27 to which the two green LEDs 21b are connected in series, and a light source unit 28 to which the two white LEDs 21c are connected in series. In the lighting apparatus 19, the respective light source units 26 to 28 are configured to respectively radiate light of colors that differ from one another. Hereinafter, in the present embodiment, the three light source units 26 to 28 may also be referred to as a first light source unit 26, a second light source unit 27, and a third light source unit 28 for convenience of explanation.

The respective lighting circuits 15 are connected in parallel to one another. Hereinafter, in the present embodiment, the three lighting circuits 15 may also be referred to as a first lighting circuit 15a, a second lighting circuit 15b, and a third lighting circuit 15c for convenience of explanation.

A high potential side output end among a pair of output ends of the first lighting circuit 15a is connected to first ends of the respective light source units 26 to 28 via a connector 16. A second end of the first light source unit 26 is connected to a low potential side output end among a pair of output ends of the first lighting circuit 15a via the connector 16. A second end of the second light source unit 27 is connected to a low potential side output end among a pair of output ends of the second lighting circuit 15b via the connector 16. A second end of the third light source unit 28 is connected to a low potential side output end among a pair of output ends of the third lighting circuit 15c via the connector 16.

A pair of input ends of each of the lighting circuits 15a to 15c is connected to a pair of output ends of the power supply circuit 1.

A burst signal generating unit (not shown) of the output control unit 6 is configured to generate a burst signal (hereinafter, referred to as a "fourth burst signal") including an on-duty ratio for lighting the first light source unit 26 according to a result of the determination from the determining unit 5. In addition, the burst signal generating unit is configured to generate a burst signal (hereinafter, referred to as a "fifth burst signal") including an on-duty ratio for lighting the second light source unit 27 according to a result of the determination from the determining unit 5. Furthermore, the burst signal generating unit is configured to generate a burst signal (hereinafter, referred to as a "sixth burst signal") including an on-duty ratio for lighting the third light source unit 28 according to a result of the determination from the determining unit 5. Moreover, in the present embodiment, for example, a PWM signal is respectively used as the fourth burst signal, the fifth burst signal, and the sixth burst signal.

A switching signal generating unit (not shown) of the output control unit 6 is configured to generate a switching signal (hereinafter, referred to as a "fourth switching signal") according to a first detected signal and a second detected signal from the first lighting circuit 15a. The fourth switching signal is a signal for turning on/off a switching element (not shown) of a chopper circuit (not shown) of the first lighting circuit 15a.

In addition, the switching signal generating unit is configured to generate a switching signal (hereinafter, referred to as a "fifth switching signal") according to a first detected signal and a second detected signal from the second lighting circuit 15b. The fifth switching signal is a signal for turning on/off a switching element (not shown) of a chopper circuit (not shown) of the second lighting circuit 15b.

Furthermore, the switching signal generating unit is configured to generate a switching signal (hereinafter, referred to as a "sixth switching signal") according to a first detected signal and a second detected signal from the third lighting circuit 15c. The sixth switching signal is a signal for turning on/off a switching element (not shown) of a chopper circuit (not shown) of the third lighting circuit 15c.

Moreover, in the present embodiment, for example, a PWM signal is respectively used as the fourth switching signal, the fifth switching signal, and the sixth switching signal.

An output unit (not shown) of the output control unit 6 is configured to compute a logical AND of the fourth burst signal from the burst signal generating unit and the fourth switching signal from the switching signal generating unit with the computing unit described earlier. In addition, the output unit is configured to output a drive signal (hereinafter, referred to as a "fifth drive signal") to a gate drive circuit (not shown) of the first lighting circuit 15a according to the result of the computation.

In addition, the output unit is configured to compute a logical AND of the fifth burst signal from the burst signal generating unit and the fifth switching signal from the switching signal generating unit with the computing unit described earlier. Furthermore, the output unit is configured to output a drive signal (hereinafter, referred to as a "sixth drive signal") to a gate drive circuit (not shown) of the second lighting circuit 15b according to the result of the computation.

Furthermore, the output unit is configured to compute a logical AND of the sixth burst signal from the burst signal generating unit and the sixth switching signal from the switching signal generating unit with the computing unit described earlier. In addition, the output unit is configured to output a drive signal (hereinafter, referred to as a "seventh drive signal") to a gate drive circuit (not shown) of the third lighting circuit 15c according to the result of the computation.

Moreover, in the present embodiment, for example, a PWM signal is respectively used as the fifth drive signal, the sixth drive signal, and the seventh drive signal.

In addition, the control circuit 3 is configured to respectively control the chopper circuits described above so that light respectively radiated from the light source units 26 to 28 is mixed and a prescribed mixed-color light is produced in the normal mode.

Hereinafter, operations in the lighting apparatus 19 according to the present embodiment when the control circuit 3 is in the normal mode will be briefly described. In addition, in the present embodiment, descriptions of operations similar to those of the first embodiment will be omitted as appropriate.

The burst signal generating unit respectively generates a fourth burst signal, a fifth burst signal, and a sixth burst signal according to the result of the determination from the determining unit 5. In addition, the burst signal generating unit outputs the fourth burst signal, the fifth burst signal, and the sixth burst signal to the output unit.

The switching signal generating unit respectively generates a fourth switching signal, a fifth switching signal, and a sixth switching signal according to a first detected signal and a second detected signal from the respective lighting circuits 15a to 15c. The switching signal generating unit outputs the fourth switching signal, the fifth switching signal, and the sixth switching signal to the output unit.

The output unit computes logical ANDs of the fourth burst signal, the fifth burst signal, and the sixth burst signal from the burst signal generating unit and the fourth switching signal, the fifth switching signal, and the sixth switching signal from the switching signal generating unit with the computing unit described earlier. In addition, the output unit respectively generates a fifth drive signal, a sixth drive signal, and a seventh drive signal according to the result of the computation. Furthermore, the output unit respectively outputs the fifth drive signal, the sixth drive signal, and the seventh drive signal to the respective gate drive circuits described earlier.

The respective gate drive circuits drive (turn on/off) the respective switching elements according to the corresponding fifth drive signal, sixth drive signal, or seventh drive signal from the output unit.

The control circuit 3 is configured to simultaneously control currents $I_{L1}$ that flow through the respective inductors (not shown) of the respective chopper circuits by turning on/off the respective switching elements according to the fifth drive signal, the sixth drive signal, and the seventh drive signal in the normal mode. Accordingly, with the lighting apparatus 19, when the control circuit 3 is in the normal mode, the respective light source units 26 to 28 can be lighted, light respectively radiated from the light source units 26 to 28 can be mixed, and a prescribed mixed-color light can be produced.

Figure 14A:
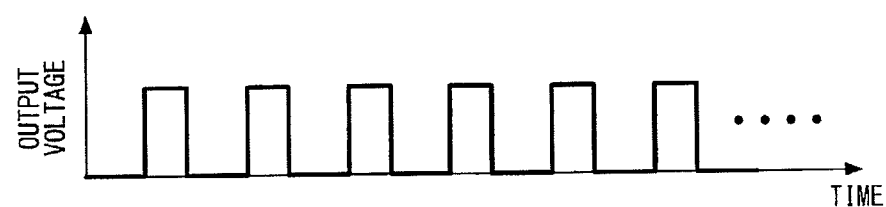
FIG. 14A is an explanatory diagram of respective drive signals in another lighting apparatus according to the fourth embodiment.
Figure 14B:
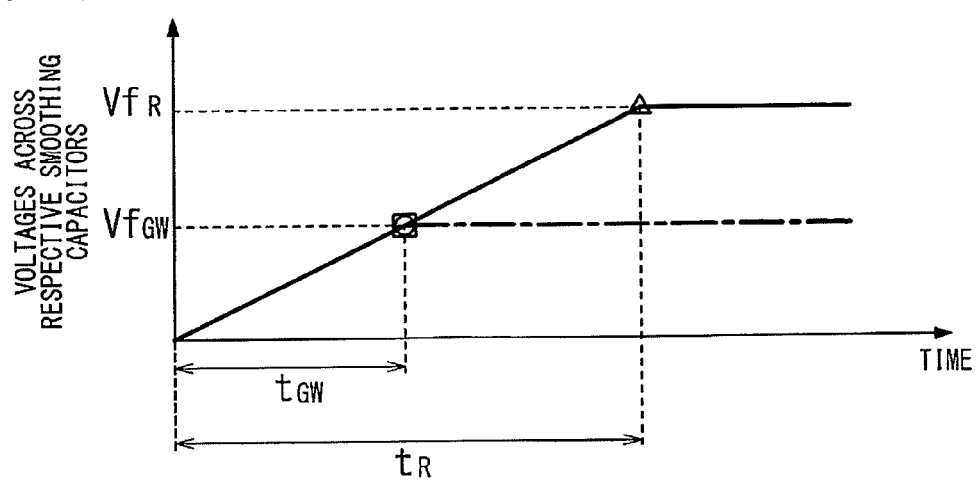
FIG. 14B is a correlation diagram between voltages across the respective smoothing capacitors and periods of time from an unlighted state to lighting of respective solid state light-emitting elements in the another lighting apparatus according to the fourth embodiment.

The present inventors considered another lighting apparatus (hereinafter, referred to as a "fifth lighting apparatus") that charges the smoothing capacitor C1 with only an operation in the normal mode. In addition, the present inventors considered, in the fifth lighting apparatus, for example, respectively setting on-widths $t_{ON}$ of the fifth drive signal, the sixth drive signal, and the seventh drive signal from the output unit to a same on-width (refer to FIG. 14A). Furthermore, the present inventors considered, in the fifth lighting apparatus, for example, respectively setting frequencies of the fifth drive signal, the sixth drive signal, and the seventh drive signal from the output unit to a same frequency (refer to FIG. 14A). In addition, the present inventors considered that, in the fifth lighting apparatus, turning on/off the respective switching elements with the fifth drive signal, the sixth drive signal, and the seventh drive signal causes the second light source unit 27 and the third light source unit 28 having a low total voltage of rated forward voltages to be respectively lighted first (refer to FIG. 14B). In this case, $Vf_R$ in FIG. 14B denotes a total voltage of rated forward voltages of the red LEDs 21a. In addition, $Vf_{GW}$ in FIG. 14B denotes a total voltage of rated forward voltages of the green LEDs 21b. Furthermore, $Vf_{GW}$ in FIG. 14B also denotes a total voltage of rated forward voltages of the white LEDs 21c. In addition, $t_{GW}$ in FIG. 14B denotes a period of time from an unlighted state to lighting of each of the second light source unit 27 and the third light source unit 28. Furthermore, $t_R$ in FIG. 14B denotes a period of time from an unlighted state to full lighting of the first light source unit 26. In addition, "Δ" in FIG. 14B denotes a time point when the first light source unit 26 is lighted. Furthermore, "O" in FIG. 14B denotes a time point when the second light source unit 27 is lighted. In addition, "□" in FIG. 14B denotes a time point when the third light source unit 28 is lighted. Furthermore, a solid line in FIG. 14B depicts a change in the voltage $V_C$ across the smoothing capacitor of the first lighting circuit 15a. In addition, a dash dotted line in FIG. 14B depicts a part of a change in the voltages $V_C$ across the respective smoothing capacitors of the second lighting circuit 15b and the third lighting circuit 15c. Furthermore, FIG. 14B shows that, in a period of time from an unlighted state to lighting of each of the second light source unit 27 and the third light source unit 28 ($t_{GW}$ in FIG. 14B), the changes in the voltages $V_C$ across the respective smoothing capacitors of the second lighting circuit 15b and the third lighting circuit 15c are the same as the change in the voltage $V_C$ across the smoothing capacitor of the first lighting circuit 15a.

In addition, the present inventors considered that lighting the second light source unit 27 (the respective green LEDs 21b) with high visibility first in a general lighting fixture used in a household may possibly cause a person present in a lighting area of the lighting fixture to feel discomfort and is therefore undesirable. Furthermore, the present inventors considered that lighting the first light source unit 26 (the respective red LEDs 21a) first whose visibility is lower than that of the third light source unit 28 (the respective white LEDs 21c) is more desirable.

The control circuit 3 is configured to respectively control the chopper circuits to charge the smoothing capacitors (not shown) of the respective chopper circuits of the respective lighting circuits 15a to 15c in the charging mode when power is supplied to the lighting apparatus 19.

In order to light the first light source unit 26 before the second light source unit 27, the present inventors considered charging the smoothing capacitor of the first lighting circuit 15a before charging the respective smoothing capacitors of the second lighting circuit 15b and the third lighting circuit 15c. In addition, the present inventors considered setting a voltage (hereinafter, referred to as a "first charging voltage") to be applied to the smoothing capacitor of the first lighting circuit 15a to a voltage that is higher than a voltage (hereinafter, referred to as a "second charging voltage") to be applied to the respective smoothing capacitors of the second lighting circuit 15b and the third lighting circuit 15c when the control circuit 3 is in the charging mode. Furthermore, the present inventors considered respectively setting the first charging voltage and the second charging voltage so as to satisfy a relational expression represented as (second charging voltage)<(first charging voltage/2) when the control circuit 3 is in the charging mode.

Figure 15A:
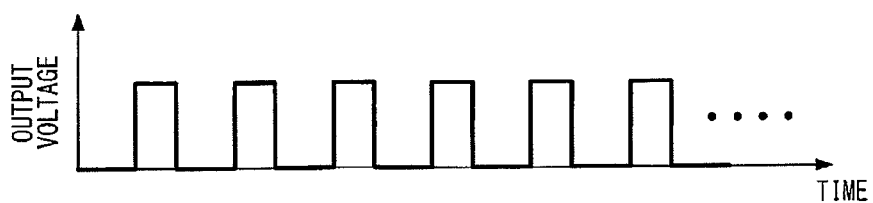
FIGS. 15A and 15B are explanatory diagrams of respective drive signals in the lighting apparatus according to the fourth embodiment.
Figure 15B:
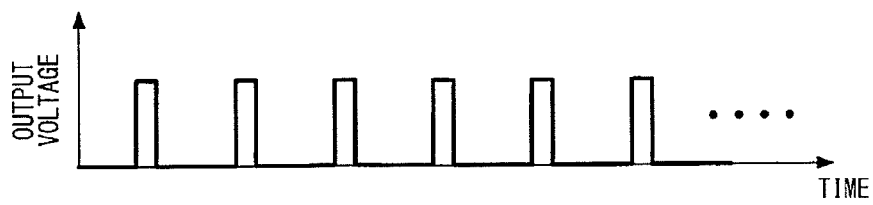

In the lighting apparatus 19, the control circuit 3 is configured to individually control the currents $I_{L1}$ that flow through the respective inductors of the respective chopper circuits in the charging mode. Specifically, in the present embodiment, when the control circuit 3 is in the charging mode, the frequencies of the fifth drive signal, the sixth drive signal, and the seventh drive signal are set to the same frequency and, at the same time, the on-width $t_{ON}$ of the fifth drive signal is set to an on-width that is twice the respective on-widths $t_{ON}$ of the sixth drive signal and the seventh drive signal (refer to FIGS. 15A and 15B). Moreover, FIG. 15A shows a waveform of the fifth drive signal. In addition, FIG. 15B shows respective waveforms of the sixth drive signal and the seventh drive signal.

Figure 15C:
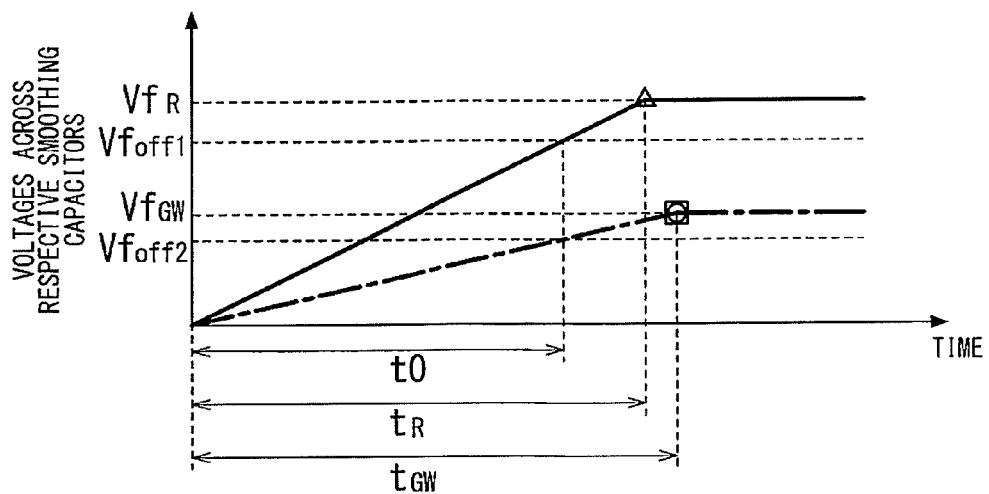
FIG. 15C is a correlation diagram between voltages across the respective smoothing capacitors and periods of time from an unlighted state to lighting of respective solid state light-emitting elements in the lighting apparatus according to the fourth embodiment.

In the lighting apparatus 19, since the control circuit 3 is configured to individually control the currents $I_{L1}$ that flow through the respective inductors of the respective chopper circuits in the charging mode, the smoothing capacitor of the first lighting circuit 15a can be charged comparatively quicker than the respective smoothing capacitors of the second lighting circuit 15b and the third lighting circuit 15c. Accordingly, in the lighting apparatus 19 according to the present embodiment, the first light source unit 26 can be lighted before the second light source unit 27 and the third light source unit 28 (refer to FIG. 15C). Moreover, $Vf_R$ in FIG. 15C denotes a total voltage of rated forward voltages of the respective red LEDs 21a. In addition, $Vf_{GW}$ in FIG. 15C denotes a total voltage of rated forward voltages of the respective green LEDs 21b. Furthermore, $Vf_{GW}$ in FIG. 15C also denotes a total voltage of rated forward voltages of the respective white LEDs 21c. In addition, $Vf_{off1}$ in FIG. 15C denotes a prescribed voltage of the smoothing capacitor of the first lighting circuit 15a. Furthermore, $Vf_{off2}$ in FIG. 15C denotes a prescribed voltage of the respective smoothing capacitors of the second lighting circuit 15b and the third lighting circuit 15c. In addition, t0 in FIG. 15C denotes a period of time required by the voltage $V_C$ across each of the smoothing capacitors to equal a prescribed voltage from 0 V. Furthermore, $t_R$ in FIG. 15C denotes a period of time from an unlighted state to lighting of the first light source unit 26. In addition, $t_{GW}$ in FIG. 15C denotes a period of time from an unlighted state to lighting of each of the second light source unit 27 and the third light source unit 28. Furthermore, "Δ" in FIG. 15C denotes a time point when the first light source unit 26 is lighted. In addition, "O" in FIG. 15C denotes a time point when the second light source unit 27 is lighted. Furthermore, "□" in FIG. 15C denotes a time point when the third light source unit 28 is lighted. In addition, a solid line in FIG. 15C depicts a change in the voltage $V_C$ across the smoothing capacitor of the first lighting circuit 15a. Furthermore, a dash dotted line in FIG. 15C depicts a change in the voltages $V_C$ across the respective smoothing capacitors of the second lighting circuit 15b and the third lighting circuit 15c.

In the present embodiment, while the frequencies of the fifth drive signal, the sixth drive signal, and the seventh drive signal are set to the same frequency and, at the same time, the on-width $t_{ON}$ of the fifth drive signal is set to an on-width that is twice the respective on-widths $t_{ON}$ of the sixth drive signal and the seventh drive signal, these settings are not restrictive. For example, in the present embodiment, the on-widths $t_{ON}$ of the fifth drive signal, the sixth drive signal, and the seventh drive signal may be set to a same on-width and, at the same time, the frequency of the fifth drive signal may be set to a frequency that is ½ of the frequencies of the sixth drive signal and the seventh drive signal.

In addition, while the red LED 21a, the green LED 21b, and the white LED 21c are adopted as the respective solid state light-emitting elements 21 in the present embodiment, the solid state light-emitting elements 21 are not limited thereto and, for example, the red LED 21a, the green LED 21b, and an LED (hereinafter, referred to as a "blue LED") that radiates blue light may be adopted. Furthermore, in the present embodiment, a configuration that does not include the current peak value detection circuit 9 may be adopted in a similar manner to the second embodiment.

The lighting apparatus 19 according to the present embodiment described above includes a plurality of the chopper circuits that individually light the plurality of light source units 26 to 28. The respective light source units 26 to 28 are formed by connecting a plurality of solid state light-emitting elements 21 in series. The respective chopper circuits are connected in parallel to one another. The control circuit 3 is configured to individually control the currents $I_{L1}$ that flow through the respective inductors of the respective chopper circuits in the charging mode. Accordingly, with the lighting apparatus 19 according to the present embodiment, the first light source unit 26 can be lighted before the second light source unit 27. As a result, the possibility that a person present in a lighting area may feel discomfort can be reduced in comparison to a case in which the second light source unit 27 with high visibility is lighted first.

The lighting apparatus 19 according to the present embodiment may be applied to, for example, the lighting fixture 30 according to the first embodiment. In this case, for example, the respective red LEDs 21a, the respective green LEDs 21b, and the respective white LEDs 21c may be respectively arranged on the one surface side of the mounting substrate 22 and the respective lighting circuits 15a to 15c may be housed in the housing 11.

Figure 16:
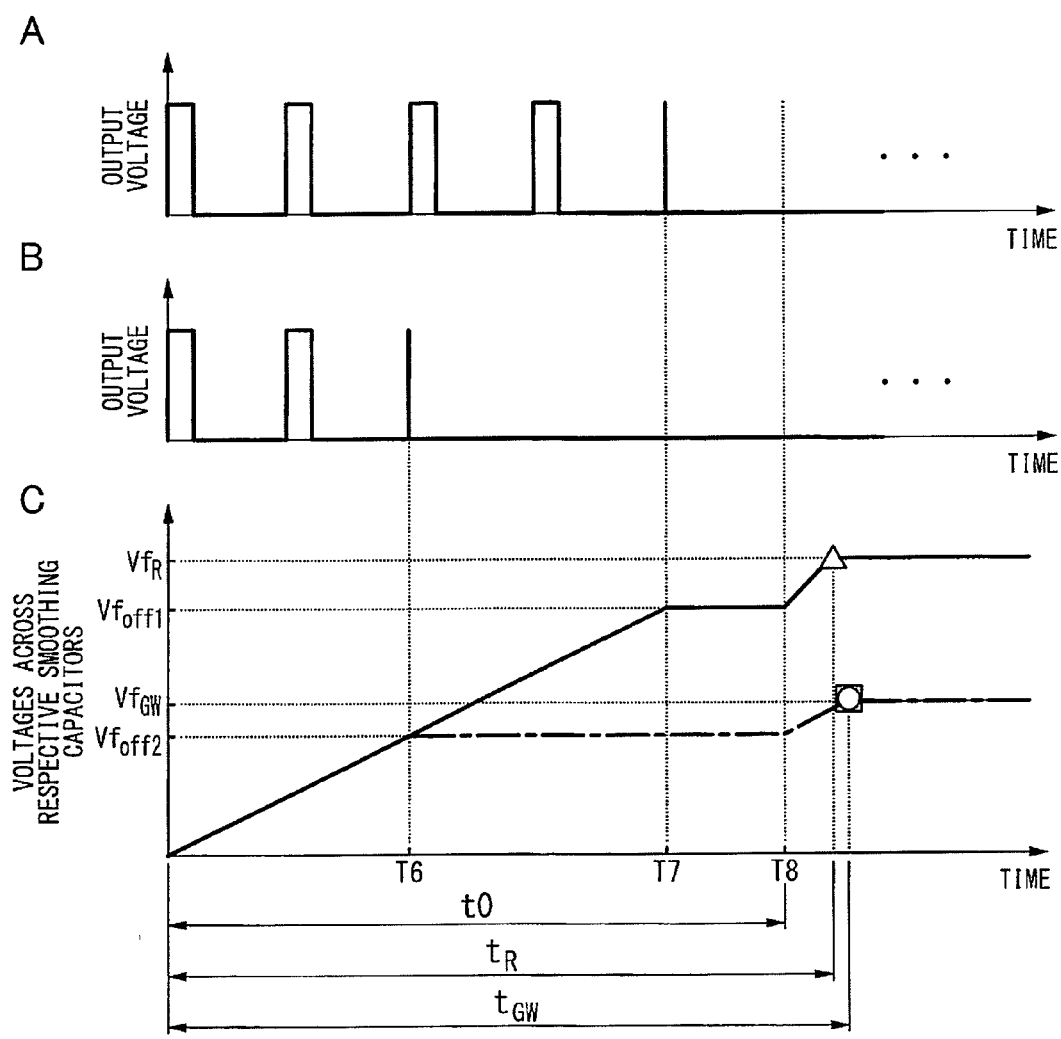
FIG. 16 relates to the lighting apparatus according to the fourth embodiment, in which "A" and "B" of FIG. 16 are explanatory diagrams of respective drive signals and "C" of FIG. 16 is a correlation diagram between voltages across the respective smoothing capacitors and periods of time from an unlighted state to lighting of respective solid state light-emitting elements in the lighting apparatus according to the fourth embodiment.

With the lighting apparatus 19, when the voltage $V_C$ across the respective smoothing capacitors of the second lighting circuit 15b and the third lighting circuit 15c reaches the prescribed voltage $Vf_{off2}$ in the charging mode (a time point denoted by T6 in "C" of FIG. 16), the control circuit 3 may stop controlling the respective chopper circuits of the second lighting circuit 15b and the third lighting circuit 15c in a similar manner to the first embodiment. In addition, with the lighting apparatus 19, when the voltage $V_C$ across the smoothing capacitor of the first lighting circuit 15a reaches the prescribed voltage $Vf_{off1}$ in the charging mode (a time point denoted by T7 in "C" of FIG. 16), the control circuit 3 may stop controlling the chopper circuit of the first lighting circuit 15a in a similar manner to the first embodiment. Accordingly, with the lighting apparatus 19, as shown in "C" of FIG. 16, the voltage $V_C$ across the respective smoothing capacitors of the second lighting circuit 15b and the third lighting circuit 15c when the startup time as clocked by the second clocking unit reaches the charging time t0 can be set to the prescribed voltage $Vf_{off2}$ regardless of variations in the capacities of the respective smoothing capacitors. In addition, with the lighting apparatus 19, as shown in "C" of FIG. 16, the voltage $V_C$ across the smoothing capacitor of the first lighting circuit 15a when the startup time as clocked by the second clocking unit reaches the charging time t0 can be set to the prescribed voltage $Vf_{off1}$ regardless of a variation in the capacity of the smoothing capacitor. In this case, $Vf_R$ in "C" of FIG. 16 denotes a total voltage of rated forward voltages of the respective red LEDs 21a. In addition, $Vf_{GW}$ in "C" of FIG. 16 denotes a total voltage of rated forward voltages of the respective green LEDs 21b. Furthermore, $Vf_{GW}$ in "C" of FIG. 16 also denotes a total voltage of rated forward voltages of the respective white LEDs 21c. In addition, t0 in "C" of FIG. 16 denotes a charging time of the respective smoothing capacitors. Furthermore, $t_R$ in "C" of FIG. 16 denotes a period of time from an unlighted state to full lighting of the first light source unit 26. In addition, $t_{GW}$ in "C" of FIG. 16 denotes a period of time from an unlighted state to lighting of each of the second light source unit 27 and the third light source unit 28. Furthermore, "A" of FIG. 16 shows a fifth drive signal from the output unit described earlier. In addition, "B" of FIG. 16 shows a sixth drive signal and a seventh drive signal from the output unit. Furthermore, "Δ" in "C" of FIG. 16 denotes a time point when the first light source unit 26 is lighted. In addition, "O" in "C" of FIG. 16 denotes a time point when the second light source unit 27 is lighted. Furthermore, "☐" in "C" of FIG. 16 denotes a time point when the third light source unit 28 is lighted. In addition, a solid line in "C" of FIG. 16 depicts a change in the voltage $V_C$ across the smoothing capacitor of the first lighting circuit 15a. Furthermore, a dash dotted line in "B" of FIG. 16 depicts a part of a change in the voltages $V_C$ across the respective smoothing capacitors of the second lighting circuit 15b and the third lighting circuit 15c. In addition, "C" of FIG. 16 shows that, during a period required by the voltages $V_C$ across the respective smoothing capacitors of the second light source unit 27 and the third light source unit 28 to equal the prescribed voltage $Vf_{off2}$ from 0 V, a change in the voltages $V_C$ across the respective smoothing capacitors of the second lighting circuit 15b and the third lighting circuit 15c is the same as a change in the voltage $V_C$ across the smoothing capacitor of the first lighting circuit 15a. Furthermore, in the present embodiment, the on-widths $t_{ON}$ of the fifth drive signal, the sixth drive signal, and the seventh drive signal from the output unit are set to a same on-width. In addition, in the present embodiment, the frequencies of the fifth drive signal, the sixth drive signal, and the seventh drive signal from the output unit are set to a same frequency.

Moreover, the control circuit 3 is configured to control the respective chopper circuits of the first to third lighting circuits 15a to 15c when the control circuit 3 makes a transition from the charging mode to the normal mode (T8 and onward in "C" of FIG. 16).

Therefore, with the lighting apparatus 19 according to the present embodiment, when lighting the respective light source units 26 to 28 in the normal mode, a variation in the lighted states of the respective light source units 26 to 28 due to a variation in the capacities of the respective smoothing capacitors can be suppressed. In addition, with the lighting apparatus 19, the on-widths $t_{ON}$ of the fifth drive signal, the sixth drive signal, and the seventh drive signal from the output unit can be respectively set to a same on-width. Furthermore, with the lighting apparatus 19, the frequencies of the fifth drive signal, the sixth drive signal, and the seventh drive signal from the output unit can be respectively set to a same frequency.

In addition, the present inventors considered turning off the respective light source units 26 to 28 based on a dimming signal from the dimmer described earlier and subsequently lighting the respective light source units 26 to 28 based on the dimming signal in the lighting apparatus 19 according to the present embodiment.

Figure 17:
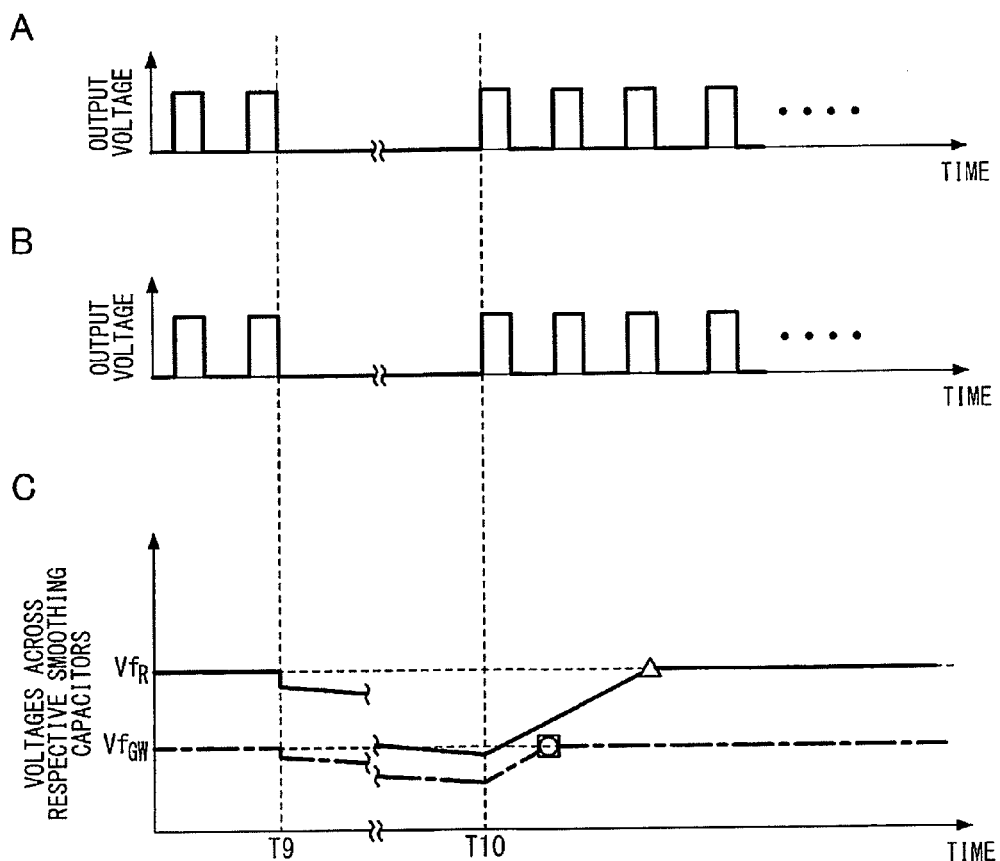
FIG. 17 relates to an example of a case of turning off respective light source units and subsequently turning on the respective light source units based on a dimming signal in the lighting apparatus according to the fourth embodiment, in which "A" and "B" of FIG. 17 are explanatory diagrams of respective drive signals and "C" of FIG. 17 is a correlation diagram between voltages across the respective smoothing capacitors and periods of time from an unlighted state to lighting of respective solid state light-emitting elements.

With the lighting apparatus 19, when the respective light source units 26 to 28 are lighted based on a dimming signal after turning off the respective light source units 26 to 28, there is a possibility that the second light source unit 27 and the third light source unit 28 are lighted before the first light source unit 26 due to the voltages $V_C$ across the respective smoothing capacitors upon lighting the respective light source units 26 to 28 (a time point denoted by T10 in "C" of FIG. 17). Therefore, with the lighting apparatus 19, the second light source unit 27 may possibly be lighted before the first light source unit 26 and, as a result, a person present in a lighting area may feel discomfort. In this case, T9 in "C" of FIG. 17 denotes a time point when the respective light source units 26 to 28 are turned off. In addition, $Vf_R$ in "C" of FIG. 17 denotes a total voltage of rated forward voltages of the respective red LEDs 21a. Furthermore, $Vf_{GW}$ in "C" of FIG. 17 denotes a total voltage of rated forward voltages of the respective green LEDs 21b. In addition, $Vf_{GW}$ in "C" of FIG. 17 also denotes a total voltage of rated forward voltages of the respective white LEDs 21c. Furthermore, "A" of FIG. 17 shows a fifth drive signal from the output unit described earlier. In addition, "B" of FIG. 17 shows a sixth drive signal and a seventh drive signal from the output unit. Furthermore, "Δ" in "C" of FIG. 17 denotes a time point when the first light source unit 26 is lighted. In addition, "O" in "C" of FIG. 17 denotes a time point when the second light source unit 27 is lighted. Furthermore, "☐" in "C" of FIG. 17 denotes a time point when the third light source unit 28 is lighted. In addition, a solid line in "C" of FIG. 17 depicts apart of a change in the voltage $V_C$ across the smoothing capacitor of the first lighting circuit 15a. Furthermore, a dash dotted line in "C" of FIG. 17 depicts a part of a change in the voltages $V_C$ across the respective smoothing capacitors of the second lighting circuit 15b and the third lighting circuit 15c.

With the lighting apparatus 19, when the respective light source units 26 to 28 are lighted based on a dimming signal after turning off the respective light source units 26 to 28, favorably, the control circuit 3 controls the respective chopper circuits to charge the respective smoothing capacitors in the charging mode and subsequently controls the respective chopper circuits to light the respective light source units 26 to 28 in the normal mode. In other words, favorably, the control circuit 3 is configured to control the respective chopper circuits to charge the respective smoothing capacitors in the charging mode when a dimming signal is input after the respective light source units 26 to 28 are turned off, and to subsequently control the respective chopper circuits to light the respective light source units 26 to 28 in the normal mode (refer to FIGS. 18 and 19). Moreover, FIG. 18 exemplifies a case in which a period of time until the respective light source units 26 to 28 are lighted based on a dimming signal after turning off the respective light source units 26 to 28 is a comparatively long period of time. In addition, FIG. 19 exemplifies a case in which a period of time until the respective light source units 26 to 28 are lighted based on a dimming signal after turning off the respective light source units 26 to 28 is a comparatively short period of time.

In this case, T11 in "C" of FIG. 18 denotes a time point when the respective light source units 26 to 28 are turned off. In addition, T12 in "C" of FIG. 18 denotes a time point when the control circuit 3 starts charging of the respective smoothing capacitors in the charging mode. Furthermore, T13 in "C" of FIG. 18 denotes a time point when the voltages $V_C$ across the respective smoothing capacitors of the second lighting circuit 15b and the third lighting circuit 15c reach the prescribed voltage $Vf_{off2}$. In addition, T14 in "C" of FIG. 18 denotes a time point when the voltage $V_C$ across the smoothing capacitor of the first lighting circuit 15a reaches the prescribed voltage $Vf_{off1}$. Furthermore, T15 in "C" of FIG. 18 denotes a time point when the control circuit 3 makes a transition from the charging mode to the normal mode. In addition, $Vf_R$ in "C" of FIG. 18 denotes a total voltage of rated forward voltages of the respective red LEDs 21a. Furthermore, $Vf_{GW}$ in "C" of FIG. 18 denotes a total voltage of rated forward voltages of the respective green LEDs 21b. In addition, $Vf_{GW}$ in "C" of FIG. 18 also denotes a total voltage of rated forward voltages of the respective white LEDs 21c. Furthermore, t0 in "C" of FIG. 18 denotes a charging time of the respective smoothing capacitors. In addition, "A" of FIG. 18 shows a fifth drive signal from the output unit described earlier. Furthermore, "B" of FIG. 18 shows a sixth drive signal and a seventh drive signal from the output unit. In addition, "Δ" in "C" of FIG. 18 denotes a time point when the first light source unit 26 is lighted. Furthermore, "O" in "C" of FIG. 18 denotes a time point when the second light source unit 27 is lighted. In addition, "☐" in "C" of FIG. 18 denotes a time point when the third light source unit 28 is lighted. Furthermore, a solid line in "C" of FIG. 18 depicts a part of a change in the voltage $V_C$ across the smoothing capacitor of the first lighting circuit 15a. In addition, a dash dotted line in "C" of FIG. 18 depicts apart of a change in the voltages $V_C$ across the respective smoothing capacitors of the second lighting circuit 15b and the third lighting circuit 15c. In addition, "C" of FIG. 18 shows that, prior to lighting the respective light source units 26 to 28, during a period required by the voltages $V_C$ across the respective smoothing capacitors of the second light source unit 27 and the third light source unit 28 to equal the prescribed voltage $Vf_{off2}$, a change in the voltages $V_C$ across the respective smoothing capacitors of the second lighting circuit 15b and the third lighting circuit 15c is the same as a change in the voltage $V_C$ across the smoothing capacitor of the first lighting circuit 15a.

Figure 19:
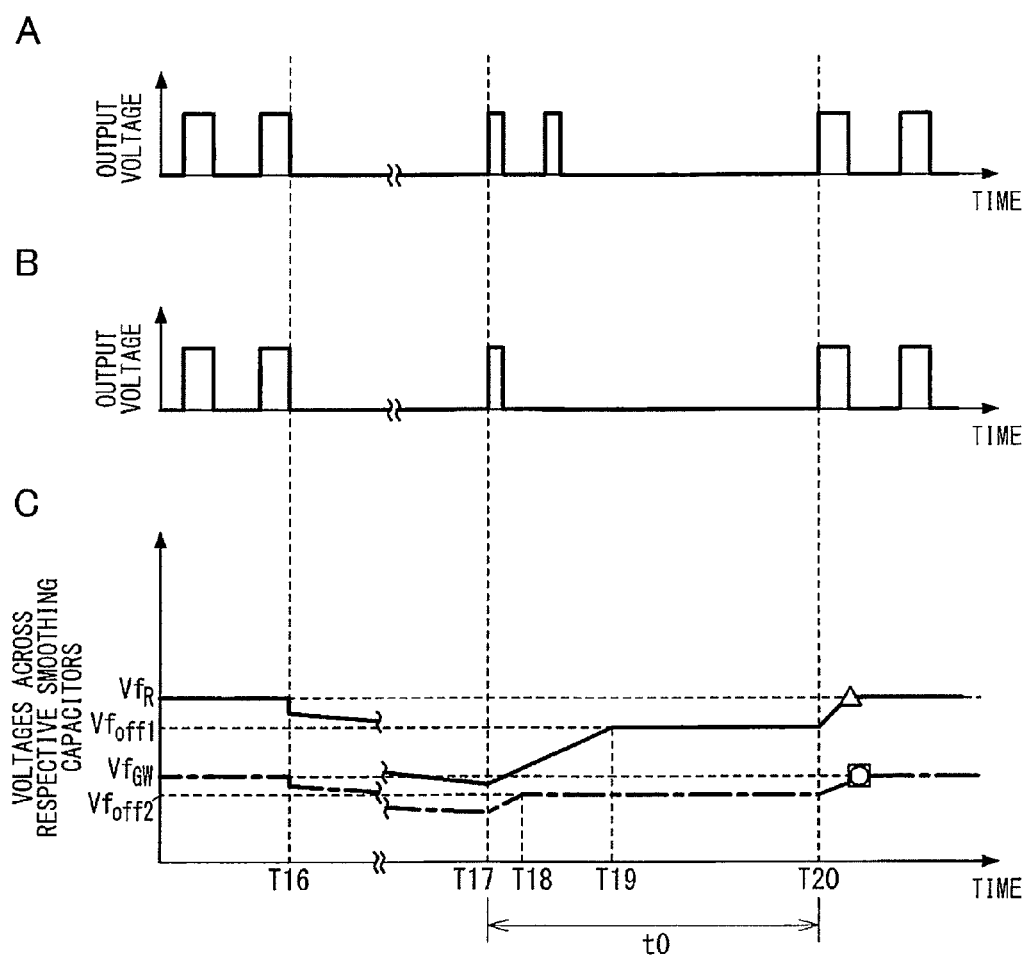
FIG. 19 relates to another example of a case of turning off respective light source units and subsequently turning on the respective light source units based on a dimming signal in the other lighting apparatus according to the fourth embodiment, in which "A" and "B" of FIG. 19 are explanatory diagrams of respective drive signals and "C" of FIG. 19 is a correlation diagram between voltages across the respective smoothing capacitors and periods of time from an unlighted state to lighting of respective solid state light-emitting elements.

In addition, T16 in "C" of FIG. 19 denotes a time point when the respective light source units 26 to 28 are turned off. Furthermore, T17 in "C" of FIG. 19 denotes a time point when the control circuit 3 starts charging the respective smoothing capacitors in the charging mode. In addition, T18 in "C" of FIG. 19 denotes a time point when the voltages $V_C$ across the respective smoothing capacitors of the second lighting circuit 15b and the third lighting circuit 15c reach the prescribed voltage $Vf_{off2}$. Furthermore, T19 in "C" of FIG. 19 denotes a time point when the voltage $V_C$ across the smoothing capacitor of the first lighting circuit 15a reaches the prescribed voltage $Vf_{off1}$. In addition, T20 in "C" of FIG. 19 denotes a time point when the control circuit 3 makes a transition from the charging mode to the normal mode. Furthermore, $Vf_R$ in "C" of FIG. 19 denotes a total voltage of rated forward voltages of the respective red LEDs 21a. In addition, $Vf_{GW}$ in "C" of FIG. 19 denotes a total voltage of rated forward voltages of the respective green LEDs 21b. Furthermore, $Vf_{GW}$ in "C" of FIG. 19 also denotes a total voltage of rated forward voltages of the respective white LEDs 21c. In addition, t0 in "C" of FIG. 19 denotes a charging time of the respective smoothing capacitors. Furthermore, "A" of FIG. 19 shows a fifth drive signal from the output unit described earlier. In addition, "B" of FIG. 19 shows a sixth drive signal and a seventh drive signal from the output unit. Furthermore, "Δ" in "C" of FIG. 19 denotes a time point when the first light source unit 26 is lighted. In addition, "O" in "C" of FIG. 19 denotes a time point when the second light source unit 27 is lighted. Furthermore, "☐" in "C" of FIG. 19 denotes a time point when the third light source unit 28 is lighted. In addition, a solid line in "C" of FIG. 19 depicts a part of a change in the voltage $V_C$ across the smoothing capacitor of the first lighting circuit 15a. Furthermore, a dash dotted line in "C" of FIG. 19 depicts a part of a change in the voltages $V_C$ across the respective smoothing capacitors of the second lighting circuit 15b and the third lighting circuit 15c.

In the lighting apparatus 19, the control circuit 3 is configured to control the respective chopper circuits to charge the respective smoothing capacitors in the charging mode when the respective light source units 26 to 28 are lighted based on the dimming signal after the respective light source units 26 to 28 are turned off. In addition, in the lighting apparatus 19, the control circuit 3 is configured to control the respective chopper circuits to charge the respective smoothing capacitors in the charging mode and to subsequently control the respective chopper circuits to light the respective light source units 26 to 28 in the normal mode. Accordingly, with the lighting apparatus 19, the second light source unit 27 and the third light source unit 28 can be prevented from being lighted before the first light source unit 26 due to the voltages V across the respective smoothing capacitors upon lighting the respective light source units 26 to 28. Therefore, with the lighting apparatus 19, when lighting the respective light source units 26 to 28 based on the dimming signal after the respective light source units 26 to 28 are turned off, the first light source unit 26 can be lighted before the second light source unit 27. As a result, with the lighting apparatus 19 according to the present embodiment, the possibility that a person present in a lighting area may feel discomfort can be reduced in comparison to a case in which the second light source unit 27 with high visibility is lighted first.

Figure 20:
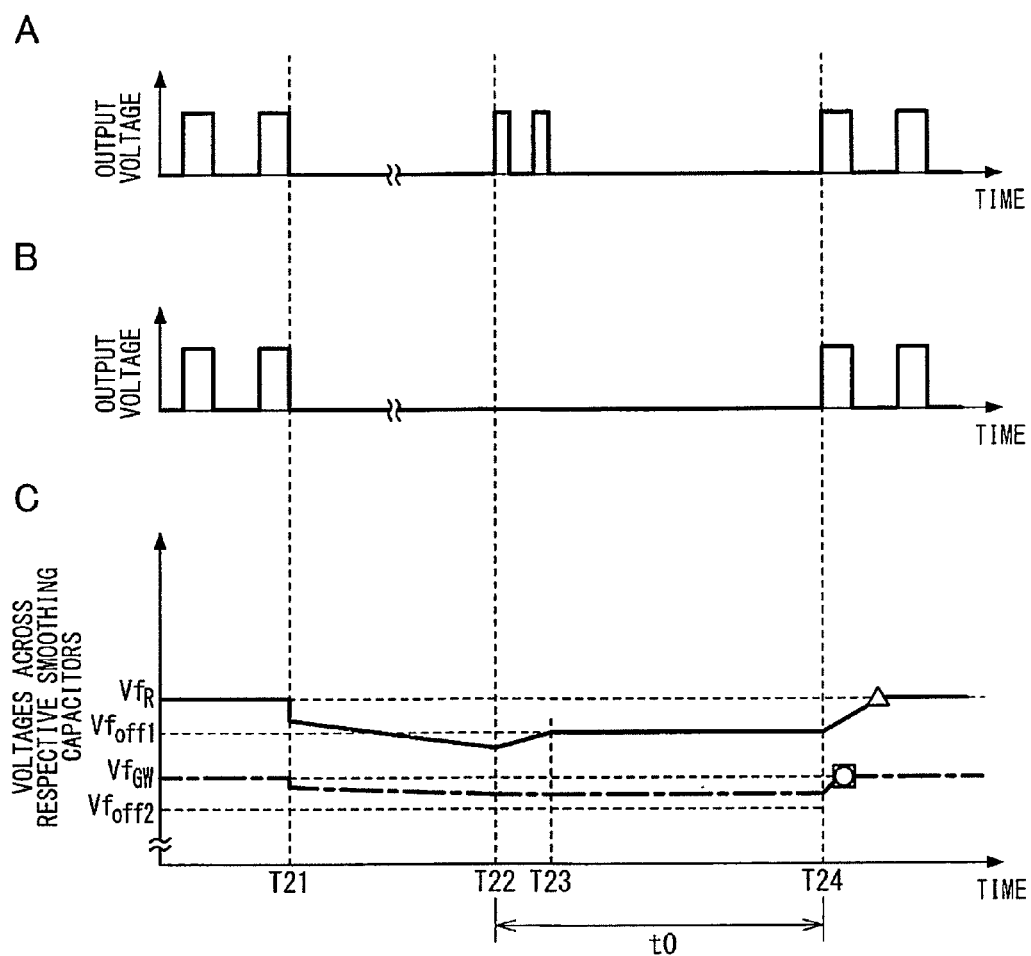
FIG. 20 relates to yet another example of a case of turning off respective light source units and subsequently turning on the respective light source units based on a dimming signal in the other lighting apparatus according to the fourth embodiment, in which "A" and "B" of FIG. 20 are explanatory diagrams of respective drive signals and "C" of FIG. 20 is a correlation diagram between voltages across the respective smoothing capacitors and periods of time from an unlighted state to lighting of respective solid state light-emitting elements.

In addition, with the lighting apparatus 19, when lighting the respective light source units 26 to 28 based on the dimming signal after the respective light source units 26 to 28 are turned off, the control circuit 3 may stop charging the respective smoothing capacitors in the charging mode when the voltages $V_C$ across the respective smoothing capacitors upon lighting the respective light source units 26 to 28 is equal to or higher than the prescribed voltage $Vf_{off1}$ and the prescribed voltage $Vf_{off2}$. By way of example, in the lighting apparatus 19, as shown in FIG. 20, when the voltage $V_C$ across the respective smoothing capacitors of the second lighting circuit 15b and the third lighting circuit 15c is equal to or higher than the prescribed voltage $Vf_{off2}$ upon lighting the respective light source units 26 to 28, the control circuit 3 may stop the charging of the respective smoothing capacitors of the second lighting circuit 15b and the third lighting circuit 15c in the charging mode. Accordingly, with the lighting apparatus 19, lighting of any of the light source units 26 to 28 can be suppressed in the charging mode.

In this case, T21 in "C" of FIG. 20 denotes a time point when the respective light source units 26 to 28 are turned off. In addition, T22 in "C" of FIG. 20 denotes a time point when the control circuit 3 starts charging the respective smoothing capacitors in the charging mode. Furthermore, T22 in "C" of FIG. 20 denotes a time point when the control circuit 3 stops charging the respective smoothing capacitors of the second lighting circuit 15b and the third lighting circuit 15c in the charging mode. In addition, T23 in "C" of FIG. 20 denotes a time point when the voltage $V_C$ across the smoothing capacitor of the first lighting circuit 15a reaches the prescribed voltage $Vf_{off1}$. Furthermore, T24 in "C" of FIG. 20 denotes a time point when the control circuit 3 makes a transition from the charging mode to the normal mode. In addition, $Vf_R$ in "C" of FIG. 20 denotes a total voltage of rated forward voltages of the respective red LEDs 21a. Furthermore, $Vf_{GW}$ in "C" of FIG. 20 denotes a total voltage of rated forward voltages of the respective green LEDs 21b. In addition, $Vf_{GW}$ in "C" of FIG. 20 also denotes a total voltage of rated forward voltages of the respective white LEDs 21c. Furthermore, t0 in "C" of FIG. 20 denotes a charging time of the respective smoothing capacitors. In addition, "A" of FIG. 20 shows a fifth drive signal from the output unit described earlier. Furthermore, "B" of FIG. 20 shows a sixth drive signal and a seventh drive signal from the output unit. In addition, "Δ" in "C" of FIG. 20 denotes a time point when the first light source unit 26 is lighted. Furthermore, "O" in "C" of FIG. 20 denotes a time point when the second light source unit 27 is lighted. In addition, "□" in "C" of FIG. 20 denotes a time point when the third light source unit 28 is lighted. Furthermore, a solid line in "C" of FIG. 20 depicts a change in the voltage $V_C$ across the smoothing capacitor of the first lighting circuit 15a. In addition, a dash dotted line in "C" of FIG. 20 depicts a change in the voltages $V_C$ across the respective smoothing capacitors of the second lighting circuit 15b and the third lighting circuit 15c.

Moreover, the present inventors considered turning off the respective light source units 26 to 28 and, subsequently, immediately lighting the respective light source units 26 to 28 based on the dimming signal in the lighting apparatus 19 according to the present embodiment.

With the lighting apparatus 19 according to the present embodiment, when the voltages $V_C$ across the respective smoothing capacitors upon lighting the respective light source units 26 to 28 are equal to or higher than the prescribed voltage $Vf_{off1}$ and the prescribed voltage $Vf_{off2}$, the control circuit 3 stops charging the respective smoothing capacitors in the charging mode. Accordingly, in the lighting apparatus 19 according to the present embodiment, the second light source unit 27 and the third light source unit 28 may possibly be lighted before the first light source unit 26 when a transition is made from the charging mode to the normal mode (T24 and onward in "C" of FIG. 20). Therefore, with the lighting apparatus 19, the second light source unit 27 may possibly be lighted before the first light source unit 26 and, as a result, a person present in a lighting area may feel discomfort.

With the lighting apparatus 19, when the respective light source units 26 to 28 are lighted based on a dimming signal after turning off the respective light source units 26 to 28, favorably, the control circuit 3 controls the respective chopper circuits to charge the respective smoothing capacitors in the charging mode after a lapse of a certain period of time tm after turning off the respective light source units 26 to 28 (a time point denoted by T25 in "C" of FIG. 21). In other words, favorably, when controlling the respective chopper circuits to light the respective light source units 26 to 28 based on a dimming signal after the respective light source units 26 to 28 are turned off, the control circuit 3 is configured to control the respective chopper circuits to charge the respective smoothing capacitors in the charging mode after a lapse of a certain period of time tm after turning off the respective light source units 26 to 28. The certain period of time tm is favorably a period of time that is longer than a period of time required by the voltages $V_C$ across the respective smoothing capacitors to drop below the prescribed voltage $Vf_{off1}$ and the prescribed voltage $Vf_{off2}$. Accordingly, with the lighting apparatus 19, timings at which the respective light source units 26 to 28 are lighted can be aligned when a transition is made from the charging mode to the normal mode even when the period of time until the respective light source units 26 to 28 are lighted based on a dimming signal after the respective light source units 26 to 28 are turned off is comparatively short. Therefore, with the lighting apparatus 19, even when the period of time until the respective light source units 26 to 28 are lighted based on a dimming signal after the respective light source units 26 to 28 are turned off is comparatively short, the possibility that a person present in a lighting area may feel discomfort can be reduced in comparison to a case in which the second light source unit 27 with high visibility is lighted first.

In this case, T25 in "C" of FIG. 21 denotes a time point when the respective light source units 26 to 28 are turned off. In addition, T26 in "C" of FIG. 21 denotes a time point when the control circuit 3 starts charging the respective smoothing capacitors in the charging mode. Furthermore, T27 in "C" of FIG. 21 denotes a time point when the certain period of time tm has lapsed after turning off the respective light source units 26 to 28. In addition, T28 in "C" of FIG. 21 denotes a time point when the voltages $V_C$ across the respective smoothing capacitors of the second lighting circuit 15b and the third lighting circuit 15c reach the prescribed voltage $Vf_{off2}$. Furthermore, T29 in "C" of FIG. 21 denotes a time point when the voltage $V_C$ across the smoothing capacitor of the first lighting circuit 15a reaches the prescribed voltage $Vf_{off1}$. In addition, T30 in "C" of FIG. 21 denotes a time point when the control circuit 3 makes a transition from the charging mode to the normal mode. Furthermore, $Vf_R$ in "C" of FIG. 21 denotes a total voltage of rated forward voltages of the respective red LEDs 21a. In addition, $Vf_{GW}$ in "C" of FIG. 21 denotes a total voltage of rated forward voltages of the respective green LEDs 21b. Furthermore, $Vf_{GW}$ in "C" of FIG. 21 also denotes a total voltage of rated forward voltages of the respective white LEDs 21c. In addition, t0 in "C" of FIG. 21 denotes a charging time of the respective smoothing capacitors. Furthermore, "A" of FIG. 21 shows a fifth drive signal from the output unit described earlier. In addition, "B" of FIG. 21 shows a sixth drive signal and a seventh drive signal from the output unit. Furthermore, "Δ" in "C" of FIG. 21 denotes a time point when the first light source unit 26 is lighted. In addition, "O" in "C" of FIG. 21 denotes a time point when the second light source unit 27 is lighted. Furthermore, "□" in "C" of FIG. 21 denotes a time point when the third light source unit 28 is lighted. In addition, a solid line in "C" of FIG. 21 depicts a part of a change in the voltage $V_C$ across the smoothing capacitor of the first lighting circuit 15a. Furthermore, a dash dotted line in "C" of FIG. 21 depicts a part of a change in the voltages $V_C$ across the respective smoothing capacitors of the second lighting circuit 15b and the third lighting circuit 15c.

While the control circuit 3 is configured to control the respective chopper circuits to charge the respective smoothing capacitors in the charging mode after a lapse of a certain period of time tm after turning off the respective light source units 26 to 28 when controlling the respective chopper circuits to light the respective light source units 26 to 28 based on a dimming signal after the respective light source units 26 to 28 are turned off, this configuration is not restrictive. When controlling the respective chopper circuits to light the respective light source units 26 to 28 based on a dimming signal after the respective light source units 26 to 28 are turned off, the control circuit 3 may be configured to control the respective chopper circuits to charge the respective smoothing capacitors in the charging mode when the voltages $V_C$ across the respective smoothing capacitors as detected by the detecting unit respectively drop below the prescribed voltage $Vf_{off1}$ and the prescribed voltage $Vf_{off2}$ after turning off the respective light source units 26 to 28.

While the lighting apparatus 19 according to the present embodiment has been described with a focus on reducing the possibility that a person present in a lighting area may feel discomfort by delaying the lighting of a light source with high visibility, a configuration in which lighting of a light source with high visibility is always delayed is not restrictive. Favorably, all light sources whose colors are to be mixed are lighted at the same time. Moreover, with the lighting apparatus 19, lighting timings of the light sources may be staggered within a range in which the possibility that a person present in a lighting area may feel discomfort is minimal.

(Fifth Embodiment)

Figure 22:
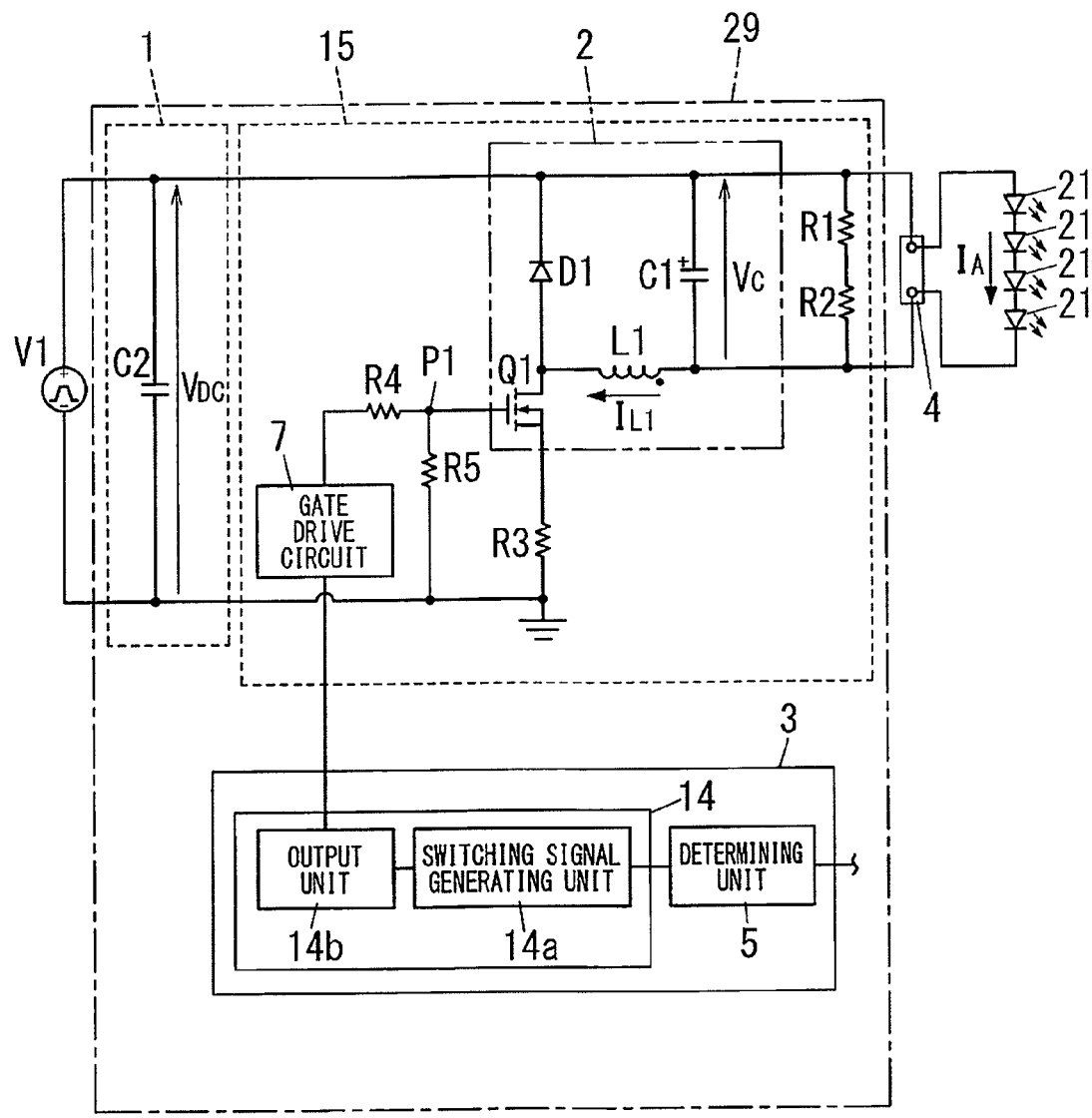
FIG. 22 is a schematic configuration diagram of a lighting apparatus according to a fifth embodiment.
Figure 23:
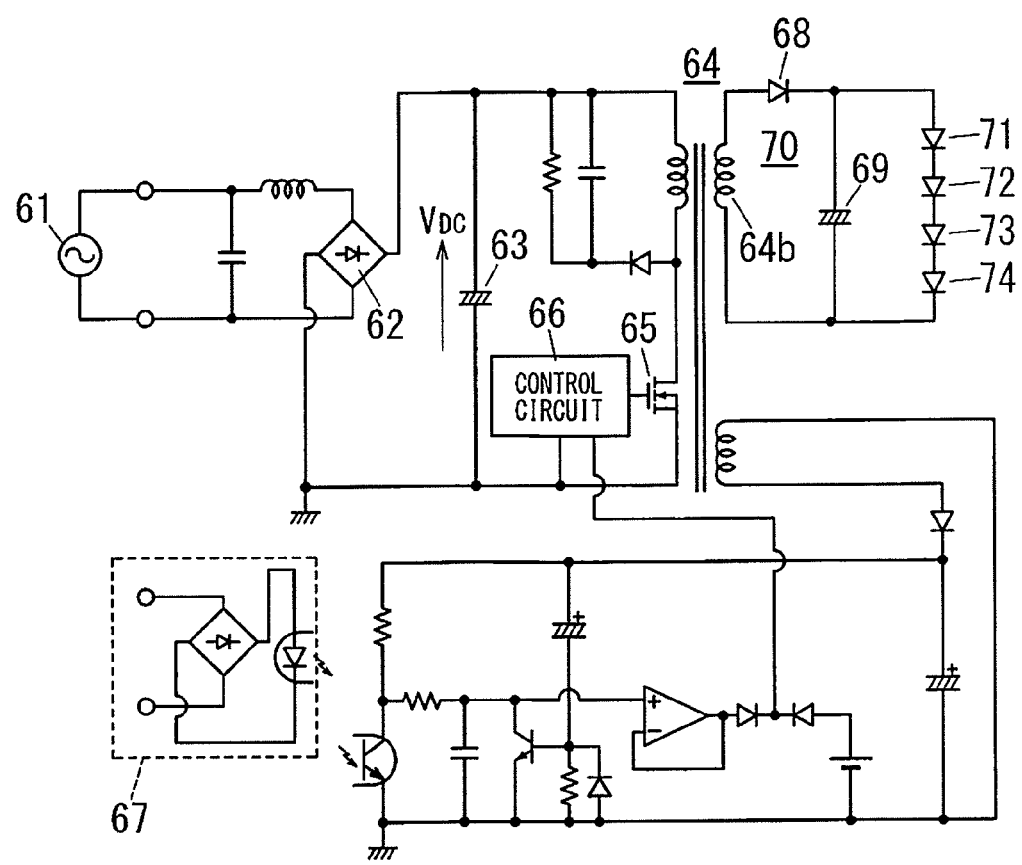
FIG. 23 is a schematic configuration diagram of a power supply apparatus according to a conventional example.

A lighting apparatus 29 according to the present embodiment has a same basic configuration as the second embodiment. However, as shown in FIG. 22, the lighting apparatus 29 according to the present embodiment differs from the second embodiment in that the zero cross detection circuit 8 and the like are not provided. It should be noted that components similar to those of the second embodiment will be denoted by the same reference numerals and descriptions thereof will be omitted as appropriate.

The lighting apparatus 29 according to the present embodiment includes an output control unit 14 with a configuration that differs from that of the output control unit 6 according to the second embodiment.

The output control unit 14 includes a switching signal generating unit 14a that generates a switching signal (hereinafter, referred to as a "seventh switching signal") according to a result of the determination from the determining unit 5 and an output unit 14b that outputs the seventh switching signal generated by the switching signal generating unit 14a. The seventh switching signal is a signal for turning on/off the switching element Q1. Moreover, in the present embodiment, for example, a PWM signal is used as the seventh switching signal. In addition, in the present embodiment, a frequency of the seventh switching signal is set to a prescribed frequency.

A second dimming table that includes second dimming data is stored in advance in the switching signal generating unit 14a. The second dimming data is data in which an on-duty ratio of a dimming signal and an on-width $t_{ON}$ of the seventh switching signal are associated with one another.

The switching signal generating unit 14a is configured to decide the on-width $t_{ON}$ of the seventh switching signal corresponding to a result of the determination from the determining unit 5 based on the second dimming table. In addition, the switching signal generating unit 14a is configured to generate a seventh switching signal including the on-width $t_{ON}$.

The output unit 14b is configured to output the seventh switching signal generated by the switching signal generating unit 14a to the gate drive circuit 7.

The gate drive circuit 7 is configured to drive (turn on/off) the switching element Q1 according to the seventh drive signal from the output unit 14b.

With the lighting apparatus 29 according to the present embodiment, the current $I_{L1}$ that flows through the inductor L1 increases/decreases with time as the gate drive circuit 7 turns on/off the switching element Q1 according to the seventh switching signal.

Hereinafter, operations in the lighting apparatus 29 according to the present embodiment when the control circuit 3 is in the normal mode will be briefly described. In addition, in the present embodiment, descriptions of operations similar to those of the second embodiment will be omitted as appropriate.

The switching signal generating unit 14a generates the seventh switching signal according to the determination result from the determining unit 5.

The output unit 14b outputs the seventh switching signal generated by the switching signal generating unit 14a to the gate drive circuit 7.

The gate drive circuit 7 drives (turns on/off) the switching element Q1 according to the seventh drive signal from the output unit 14b.

The present inventors considered another lighting apparatus (hereinafter, referred to as a "sixth lighting apparatus") that charges the smoothing capacitor C1 with only an operation in the normal mode. In addition, the present inventors considered that, when dimming the respective solid state light-emitting elements 21 at a dimming level that is a lower limit of dimming of the respective solid state light-emitting elements 21 from an unlighted state of the respective solid state light-emitting elements 21 in the sixth lighting apparatus, since the on-duty ratio of the dimming ratio is small, an average value of the current $I_{L1}$ that flows through the inductor L1 decreases and, as a result, the charging time t0 that is required to charge the smoothing capacitor C1 increases.

With the lighting apparatus 29 according to the present embodiment, the control circuit 3 is configured to set a current peak value of the current $I_{L1}$ that flows through the inductor L1 in the charging mode to a current peak value that is higher than a current peak value of the current $I_{L1}$ that flows through the inductor L1 when the determination result by the determining unit 5 indicates the dimming level that is the lower limit of dimming. Specifically, the switching signal generating unit 14a is configured to generate a switching signal (hereinafter, referred to as an "eighth switching signal"). The eighth switching signal is a switching signal that includes a greater on-width than the on-width $t_{ON}$ of the seventh switching signal when the respective solid state light-emitting elements 21 are dimmed at a dimming level that is a lower limit of dimming in the normal mode. Moreover, in the present embodiment, for example, a PWM signal is used as the eighth switching signal. In addition, in the present embodiment, a frequency of the eighth switching signal is set to a same frequency as the frequency of the seventh switching signal.

The output unit 14b is configured to output the eighth switching signal generated by the switching signal generating unit 14a to the gate drive circuit 7.

The gate drive circuit 7 is configured to drive (turn on/off) the switching element Q1 according to the eighth drive signal from the output unit 14b.

Therefore, with the lighting apparatus 29 according to the present embodiment, the control circuit 3 is configured to set a current peak value of the current $I_{L1}$ that flows through the inductor L1 in the charging mode to a current peak value that is higher than a current peak value of the current $I_{L1}$ that flows through the inductor L1 when the determination result by the determining unit 5 indicates the dimming level that is the lower limit of dimming. Accordingly, with the lighting apparatus 29 according to the present embodiment, an average value of the current $I_{L1}$ that flows through the inductor L1 can be increased in comparison to the sixth lighting apparatus. As a result, with the lighting apparatus 29, the charging time t0 required to charge the smoothing capacitor C1 can be reduced in comparison to the sixth lighting apparatus.

In addition, in the lighting apparatus 29 according to the present embodiment, favorably, a current peak value of the current $I_{L1}$ that flows through the inductor L1 in the charging mode is set to a current peak value that is equal to or lower than a rated current value $I_S$ of the inductor L1. Accordingly, with the lighting apparatus 29 according to the present embodiment, since the current $I_{L1}$ flowing through the inductor L1 can be prevented from exceeding the rated current value $I_S$ of the inductor L1, an overcurrent can be prevented from flowing through the inductor L1. Therefore, with the lighting apparatus 29, since the inductor L1 can be prevented from becoming saturated, excessive stress that is applied to the switching element Q1 and the diode D1 can be suppressed.

While the on-width $t_{ON}$ of the eighth switching signal is set to be greater than the on-width $t_{ON}$ of the seventh switching signal in the present embodiment, this setting is not restrictive. For example, in the present embodiment, an on-duty ratio of the eighth switching signal may be set to be greater than the on-duty ratio of the seventh switching signal.

With the lighting apparatus 29 according to the present embodiment, the control circuit 3 is configured to set a current peak value of the current $I_{L1}$ that flows through the inductor L1 in the charging mode to a current peak value which is a current peak value that is equal to or lower than the rated current value $I_S$ of the inductor L1 and which is higher than a current peak value of the current $I_{L1}$ that flows through the inductor L1 when the determination result by the determining unit 5 indicates the dimming level that is the lower limit of dimming. Accordingly, with the lighting apparatus 29 according to the present embodiment, since the inductor L1 can be prevented from becoming saturated, excessive stress that is applied to the switching element Q1 and the diode D1 can be suppressed. In addition, with the lighting apparatus 29, an average value of the current $I_{L1}$ that flows through the inductor L1 can be increased and the smoothing capacitor C1 can be charged comparatively quickly in comparison to the sixth lighting apparatus.

Furthermore, with the lighting apparatus 29 according to the present embodiment, the control circuit 3 is configured to make a transition from the charging mode to the normal mode immediately after charging the smoothing capacitor C1 in the charging mode when power is supplied to the lighting apparatus 29, and to control the chopper circuit 2 to light each solid state light-emitting element 21 in the normal mode. Accordingly, with the lighting apparatus 29, when dimming each solid state light-emitting element 21 at a dimming level that is the lower limit of dimming of the solid state light-emitting element 21 from an unlighted state of the solid state light-emitting element 21, a period of time t2 from an unlighted state to dimming of each solid state light-emitting element 21 can be comparatively reduced.

In addition, since the lighting apparatus 29 according to the present embodiment is configured without the zero cross detection circuit 8 according to the second embodiment, downsizing from the lighting apparatus 17 according to the second embodiment can be achieved.

The lighting apparatus 29 according to the present embodiment may be applied to, for example, the lighting fixture 30 according to the first embodiment.

While the present invention has been described in its preferred embodiments, it will be understood by those skilled in the art that various changes and modifications may be made without departing from the spirit and scope of the invention as hereinafter claimed.

The invention claimed is:

1. A lighting apparatus comprising at least one chopper circuit that comprises a switching element, an inductor, a diode, and a smoothing capacitor, and a control circuit that controls the at least one chopper circuit,
wherein the control circuit comprises:
a determining unit configured to determine a duty ratio of a dimming signal that instructs a dimming level of a solid state light-emitting element provided in a subsequent stage of the at least one chopper circuit; and
an output control unit configured to output a drive signal for driving the switching element,
wherein the control circuit has a normal mode and a charging mode as operating modes,
wherein the control circuit is configured to output the drive signal from the output control unit according to a determination result by the determining unit and to control the at least one chopper circuit to light the solid state light-emitting element in the normal mode, and configured to set an average value of a current flowing through the inductor to be higher than an average value of a current flowing through the inductor when the solid state light-emitting element is dimmed at a dimming level that is a lower limit of dimming in the normal mode, and to control the at least one chopper circuit to charge the smoothing capacitor until a voltage across the smoothing capacitor reaches a prescribed voltage that does not light the solid state light-emitting element in the charging mode, and wherein the control circuit is configured to control the at least one chopper circuit to charge the smoothing capacitor in the charging mode when power is supplied to the lighting apparatus, and to subsequently control the at least one chopper circuit to light the solid state light-emitting element in the normal mode.

2. The lighting apparatus according to claim 1,
wherein the output control unit comprises:
a burst signal generating unit configured to generate a burst signal that is constituted by a PWM signal;
a switching signal generating unit configured to generate a switching signal for turning on/off the switching element; and
an output unit configured to generate the drive signal according to the burst signal from the burst signal generating unit and the switching signal from the switching signal generating unit and output the drive signal, and
wherein the burst signal generating unit is configured to generate a first burst signal that is the burst signal including a value of an off-duty ratio of the dimming signal as an on-duty ratio according to the determination result by the determining unit in the normal mode, and the burst signal generating unit is configured to generate a second burst signal that is the burst signal including an on-duty ratio that is greater than the on-duty ratio of the first burst signal when the determination result by the determining unit indicates the dimming level that is the lower limit of dimming in the charging mode.

3. The lighting apparatus according to claim 2, wherein a period of time in which the solid state light-emitting element is not lighted is provided after the voltage across the smoothing capacitor reaches the prescribed voltage and before making a transition to the normal mode.

4. The lighting apparatus according to claim 2, wherein a period of time until the voltage across the smoothing capacitor reaches the prescribed voltage is longer than a period of time until the dimming signal input to the determining unit stabilizes.

5. The lighting apparatus according to claim 1,
wherein the at least one chopper circuit comprises a plurality of chopper circuits configured to individually light a plurality of light source units,
wherein each of the plurality of light source units is formed by connecting a plurality of solid state light-emitting elements in series, the plurality of chopper circuits being connected in parallel to one another, each of the plurality of solid state light-emitting elements being the solid state light-emitting element, and
wherein the control circuit is configured to individually control the current flowing through the inductor in each of the plurality of chopper circuits in the charging mode.

6. The lighting apparatus according to claim 5,
wherein the plurality of light source units are configured to radiate light of colors that differ from one another,
wherein the control circuit is configured to individually control the current flowing through the inductor in each of the plurality of chopper circuits in the charging mode, and to control the plurality of chopper circuits so that light respectively radiated from the plurality of light source units are mixed to produce a prescribed mixed-color light in the normal mode, and
wherein the control circuit is configured to control the plurality of chopper circuits to charge the smoothing capacitor of each of the plurality of chopper circuits in the charging mode when the dimming signal is input after the plurality of light source units are turned off and to subsequently control the plurality of chopper circuits to light the plurality of light source units in the normal mode.

7. The lighting apparatus according to claim 6,
wherein the control circuit is configured to control the plurality of chopper circuits to charge each smoothing capacitor in the charging mode after a certain period of time has lapsed from turning off the plurality of light source units, when controlling the plurality of chopper circuits to light the plurality of light source units based on the dimming signal after turning the plurality of light source units off, and
wherein the certain period of time is longer than a period of time until the voltage across each smoothing capacitor falls below the prescribed voltage.

8. The lighting apparatus according to claim 5,
wherein the control circuit comprises a detecting unit configured to detect the voltage across the smoothing capacitor, and
wherein the control circuit is configured to control the at least one chopper circuit to stop charging the smoothing capacitor or to charge the smoothing capacitor so as not to light the solid state light-emitting element when the voltage across the smoothing capacitor as detected by the detecting unit reaches the prescribed voltage in the charging mode.

9. The lighting apparatus according to claim 5, wherein a period of time in which the solid state light-emitting element is not lighted is provided after the voltage across the smoothing capacitor reaches the prescribed voltage and before making a transition to the normal mode.

10. The lighting apparatus according to claim 5, wherein a period of time until the voltage across the smoothing capacitor reaches the prescribed voltage is longer than a period of time until the dimming signal input to the determining unit stabilizes.

11. The lighting apparatus according to claim 1,
wherein the control circuit comprises a detecting unit configured to detect the voltage across the smoothing capacitor, and
wherein the control circuit is configured to control the at least one chopper circuit to stop charging the smoothing capacitor or to charge the smoothing capacitor so as not to light the solid state light-emitting element when the voltage across the smoothing capacitor as detected by the detecting unit reaches the prescribed voltage in the charging mode.

12. The lighting apparatus according to claim 11,
wherein the detecting unit comprises a clocking unit configured to clock a period of time in which the current flowing through the inductor increases and a period of time in which the current flowing through the inductor decreases, and
wherein the control circuit is configured to calculate the voltage across the smoothing capacitor based on each period of time as clocked by the clocking unit.

13. The lighting apparatus according to claim 12, wherein a period of time in which the solid state light-emitting element is not lighted is provided after the voltage across the smoothing capacitor reaches the prescribed voltage and before making a transition to the normal mode.

14. The lighting apparatus according to claim 11, wherein a period of time in which the solid state light-emitting element is not lighted is provided after the voltage across the smoothing capacitor reaches the prescribed voltage and before making a transition to the normal mode.

15. The lighting apparatus according to claim 11, wherein a period of time until the voltage across the smoothing capacitor reaches the prescribed voltage is longer than a period of time until the dimming signal input to the determining unit stabilizes.

16. The lighting apparatus according to claim 1, wherein a period of time in which the solid state light-emitting element is not lighted is provided after the voltage across the smoothing capacitor reaches the prescribed voltage and before making a transition to the normal mode.

17. The lighting apparatus according to claim 1, wherein the control circuit is configured to set a current peak value of the current flowing through the inductor in the charging mode to a current peak value which is equal to or lower than a rated current value of the inductor and which is higher than a current peak value of the current flowing through the inductor when the determination result by the determining unit indicates the dimming level that is the lower limit of dimming.

18. The lighting apparatus according to claim 1, wherein a period of time until the voltage across the smoothing capacitor reaches the prescribed voltage is longer than a period of time until the dimming signal input to the determining unit stabilizes.

19. A lighting fixture comprising:
a solid state light-emitting element; and
a lighting apparatus configured to light the solid state light-emitting element,
wherein the lighting apparatus comprising at least one chopper circuit that comprises a switching element, an inductor, a diode, and a smoothing capacitor, and a control circuit that controls the at least one chopper circuit,
wherein the control circuit comprises:
a determining unit configured to determine a duty ratio of a dimming signal that instructs a dimming level of the solid state light-emitting element provided in a subsequent stage of the at least one chopper circuit; and
an output control unit configured to output a drive signal for driving the switching element,
wherein the control circuit has a normal mode and a charging mode as operating modes,
wherein the control circuit is configured to output the drive signal from the output control unit according to a determination result by the determining unit and to control the at least one chopper circuit to light the solid state light-emitting element in the normal mode, and configured to set an average value of a current flowing through the inductor to be higher than an average value of a current flowing through the inductor when the solid state light-emitting element is dimmed at a dimming level that is a lower limit of dimming in the normal mode, and to control the at least one chopper circuit to charge the smoothing capacitor until a voltage across the smoothing capacitor reaches a prescribed voltage that does not light the solid state light-emitting element in the charging mode, and
wherein the control circuit is configured to control the at least one chopper circuit to charge the smoothing capacitor in the charging mode when power is supplied to the lighting apparatus, and to subsequently control the at least one chopper circuit to light the solid state light-emitting element in the normal mode.

20. The lighting apparatus according to claim 2,
wherein the control circuit comprises a detecting unit configured to detect the voltage across the smoothing capacitor, and
wherein the control circuit is configured to control the at least one chopper circuit to stop charging the smoothing capacitor or to charge the smoothing capacitor so as not to light the solid state light-emitting element when the voltage across the smoothing capacitor as detected by the detecting unit reaches the prescribed voltage in the charging mode.

* * * * *